(12) United States Patent
Toews et al.

(10) Patent No.: US 12,359,850 B2
(45) Date of Patent: Jul. 15, 2025

(54) CONSTRUCTION AND OPERATION OF GEOTHERMAL WELLS

(71) Applicant: EAVOR TECHNOLOGIES INC., Calgary (CA)

(72) Inventors: Matthew Toews, Calgary (CA); Paul Cairns, Calgary (CA)

(73) Assignee: Eavor Technologies Inc.

( * ) Notice: Subject to any disclaimer, the term of this patent is extended or adjusted under 35 U.S.C. 154(b) by 264 days.

(21) Appl. No.: 18/017,383

(22) PCT Filed: Jul. 21, 2021

(86) PCT No.: PCT/IB2021/056613
§ 371 (c)(1),
(2) Date: Jan. 20, 2023

(87) PCT Pub. No.: WO2022/018674
PCT Pub. Date: Jan. 27, 2022

(65) Prior Publication Data
US 2024/0035710 A1    Feb. 1, 2024

Related U.S. Application Data

(60) Provisional application No. 63/054,385, filed on Jul. 21, 2020.

(51) Int. Cl.
*F24T 10/20* (2018.01)
*F24T 10/00* (2018.01)
*F24T 50/00* (2018.01)

(52) U.S. Cl.
CPC .............. *F24T 10/20* (2018.05); *F24T 50/00* (2018.05); *F24T 2010/50* (2018.05)

(58) Field of Classification Search
CPC ....... F24T 10/20; F24T 50/00; F24T 2010/50; F24T 2010/53; F03G 4/074; E21B 43/267
(Continued)

(56) References Cited

U.S. PATENT DOCUMENTS

| 3,991,817 A | 11/1976 | Clay et al. |
| 4,051,677 A | 10/1977 | Van Huisen |

(Continued)

FOREIGN PATENT DOCUMENTS

| EP | 3114349 | 11/2019 |
| WO | WO 2017053884 | 3/2017 |
| WO | WO 2020006620 | 1/2020 |

OTHER PUBLICATIONS

International Preliminary Report on Patentability in International Appln. No. PCT/IB2021/056613, mailed on Jan. 24, 2023, 8 pages.
(Continued)

*Primary Examiner* — Jon T. Schermerhorn, Jr.
(74) *Attorney, Agent, or Firm* — Fish & Richardson P.C.

(57) ABSTRACT

Methods and system for geothermal energy harvesting using both conductive and convective heat transfer are provided. A geothermal well is provided with inlet and outlet wellbores and an interconnecting wellbore therebetween, the interconnecting wellbore fluidly connected to a plurality of fluid conduits, such as fractures. The interface of the wellbore and fractures with the surrounding earth may be impermeably sealed with a sealant. A heat transfer fluid is circulated throughout the system to extract thermal energy from the earth by conduction, as well as by convection. By providing the plurality of fluid conduits and by utilizing convective as well as conductive heat transfer, the rate of energy extraction may be increased.

11 Claims, 17 Drawing Sheets

(58) Field of Classification Search
USPC .......................................................... 165/45
See application file for complete search history.

(56) References Cited

U.S. PATENT DOCUMENTS

| | | | |
|---|---|---|---|
| 5,515,679 | A | 5/1996 | Shulman |
| 6,247,313 | B1 | 6/2001 | Moe et al. |
| 6,301,894 | B1 | 10/2001 | Halff |
| 6,668,554 | B1 | 12/2003 | Brown |
| 7,438,755 | B2 * | 10/2008 | Wagh ................. C04B 28/34 |
| | | | 106/690 |
| 9,090,810 | B2 * | 7/2015 | Bour ................... C09K 8/5045 |
| 12,241,660 | B2 * | 3/2025 | Toews .................. E21B 43/305 |
| 2007/0245729 | A1 | 10/2007 | Mickleson |
| 2011/0203795 | A1 * | 8/2011 | Murphy ................ C09K 8/467 |
| | | | 166/135 |
| 2015/0122453 | A1 | 5/2015 | Colwell et al. |
| 2016/0003021 | A1 * | 1/2016 | Nelson ................. E21B 43/267 |
| | | | 166/280.1 |
| 2017/0130703 | A1 | 5/2017 | Muir et al. |
| 2020/0190937 | A1 | 6/2020 | Nevison et al. |
| 2020/0191444 | A1 | 6/2020 | Nevison et al. |
| 2020/0309101 | A1 | 10/2020 | Muir et al. |

OTHER PUBLICATIONS

International Search Report and Written Opinion in International Appln. No. PCT/IB2021/056613, mailed on Oct. 11, 2021, 12 pages.

Wang et al., "Modeling Study of Single-Well EGS Configurations," Proceedings World Geothermal Congress, Apr. 2010, 12 pages.

* cited by examiner

CONSTRUCTION AND OPERATION OF GEOTHERMAL WELLS

CROSS-REFERENCE TO RELATED APPLICATIONS

This application is a national phase entry under 35 U.S.C. § 371 of PCT Application Serial Number PCT/IB2021/056613, filed on Jul. 21, 2021, which claims priority to U.S. Provisional Application Ser. No. 63/054,385, filed on Jul. 21, 2020.

FIELD OF THE DISCLOSURE

This disclosure relates to forming wellbores and producing energy, in particular, to drilling geothermal wellbores and producing energy using geothermal energy recovery systems and methods.

BACKGROUND

Geothermal energy is a form of thermal energy that uses the natural heat of the Earth. Geothermal energy recovery systems and methods use geothermal recovery fluids circulated in a geothermal well to recover heat from downhole formations and enable the use of such heat to generate electricity or for other purposes. The fluids can absorb heat from the rock through conductive heat transfer. Systems and methods for improving heat transfer in geothermal systems are sought.

SUMMARY

Implementations of the present disclosure include a method of forming an interface in a well. The method includes circulating a sealant in a geothermal well. The geothermal well includes: (i) a deviated wellbore fluidly coupled to a surface wellbore, the deviated wellbore residing in a target subterranean zone and at least a portion of the deviated wellbore in the subterranean zone being open hole, and (ii) a plurality of fluid conduits formed after or during drilling the deviated wellbore and residing in the subterranean zone, the fluid conduits extending from and fluidly coupled to an intermediate portion of the deviated wellbore. The method also includes forming, with the sealant, an interface between the deviated wellbore and the earth of the subterranean zone and between the fluid conduits and the earth of the subterranean zone. The interface limits or prevents fluid exchange between the geothermal well and the surrounding subterranean zone.

In some implementations, the method also includes circulating a heat transfer working fluid in the geothermal well from a surface inlet of the surface wellbore to a surface outlet of the geothermal well such that the heat transfer working fluid absorbs heat from the subterranean zone as the heat transfer working fluid flows through the deviated wellbore and through the fluids conduits. The method also includes collecting energy from the heat transfer working fluid received at the surface outlet of the geothermal well.

In some implementations, the surface wellbore includes a surface inlet wellbore and the geothermal well further includes a surface outlet wellbore fluidly coupled to the deviated wellbore. The deviated wellbore interconnects the surface inlet wellbore to the surface outlet wellbore. Circulating the sealant includes circulating the sealant between the surface inlet wellbore, the deviated wellbore, the plurality of fluid conduits, and the surface outlet wellbore.

In some implementations, the plurality of fluid conduits include at least one of (i) a plurality of branch wellbores or fractures extending downward from the deviated wellbore or (ii) a plurality of planar fractures extending radially away from the deviated wellbore.

In some implementations, the plurality of fluid conduits include a plurality of branch wellbores or fractures extending downward from the deviated wellbore. The deviated wellbore resides in a first portion of the subterranean zone including a first temperature and the branch wellbores or fractures extend to a second portion of the subterranean zone including a second temperature greater than the first temperature. Circulating the heat transfer working fluid includes flowing a portion of the heat transfer working fluid into the branch wellbores or fractures, generating a buoyancy convection cell in the branch wellbores or fractures such that the portion of the working fluid sinks into the branch wellbores or fractures, picks up heat, and rises due to buoyancy back into the deviated wellbore.

In some implementations, forming the interface includes forming an interface substantially impermeable to fluids in the deviated wellbore, in the plurality of fluid conduits while the plurality of fluid conduits are open hole, and in a junction connecting the deviated wellbore to the surface wellbore while the junction is open hole.

In some implementations, the plurality of fluid conduits include a plurality of planar fractures extending radially away from the deviated wellbore. The method also includes circulating a thermally conductive fluid in the geothermal well. The method also includes filling at least a portion of the planar fractures with the thermally conductive fluid. The method also includes forming, with the thermally conductive fluid, a thermally conductive interface between the deviated wellbore and the earth of the subterranean zone. The thermally conductive interface including a conductivity greater than the earth of the subterranean zone.

In some implementations, the geothermal well further includes deviated wellbores fluidly coupled to and extending from a common downhole end of the surface wellbore, each of the plurality of deviated wellbores residing in the target subterranean zone and at least a portion of each of the plurality of deviated wellbore in the subterranean zone being open hole.

In some implementations, the geothermal well further includes a surface outlet wellbore. The surface wellbore is a surface inlet wellbore, and the deviated wellbore is an interconnecting wellbore fluidly coupled to and interconnecting the surface inlet wellbore to the surface outlet wellbore. The interconnecting wellbore includes (i) a first lateral wellbore extending from a downhole end of the surface inlet wellbore to a downhole junction, and (ii) a second lateral wellbore extending from a downhole end of the surface outlet wellbore to the downhole junction.

In some implementations, the first lateral wellbore resides in a first portion of the target subterranean zone including a first temperature, and the second lateral wellbore resides below the first lateral wellbore. The second lateral wellbore resides in a second portion of the target subterranean zone including a second temperature greater than the first temperature. Circulating the heat transfer working fluid includes generating, with the heat transfer working fluid flowing in the interconnecting wellbore, a thermal convection cell that transfers heat through convection from the second lateral wellbore to the first lateral wellbore.

In some implementations, the fluid conduits are formed after drilling the wellbore by at least one of (i) directionally drilling the earth of the subterranean zone, (ii) fracturing the earth of the subterranean zone, or (iii) perforating the earth of the subterranean zone such that the fluid conduits increase an available heat transfer area of the geothermal well. Forming the interface includes forming the interface between the fluid conduits and the earth of the subterranean zone while the fluid conduits are open hole.

Implementations of the present disclosure also includes a wellbore construction method. The method includes drilling a surface inlet wellbore, drilling a surface outlet wellbore, and drilling a conduit fluidly coupled to and interconnecting the surface inlet wellbore to the surface outlet wellbore. The conduit resides in a geothermal subterranean zone and at least a portion of the conduit is in the geothermal subterranean zone is open hole. The conduit is configured to generate, with a heat transfer working fluid flowing in the portion of the conduit in the geothermal subterranean zone, a convection cell.

In some implementations, the conduit includes (i) a first lateral wellbore fluidly coupled to and extending from a downhole end of the surface inlet wellbore to a toe of the first lateral wellbore, and (ii) a second lateral wellbore fluidly coupled to and extending from a downhole end of the surface outlet wellbore to the toe of the first lateral. The second lateral wellbore resides below the first lateral wellbore such that circulation of the heat transfer working fluid generates the convection cell in the surrounding earth residing between the first lateral wellbore and the second lateral wellbore and transfers heat, through convection from the second lateral wellbore, through the surrounding earth, to the first lateral wellbore.

In some implementations, the method also includes circulating a heat transfer working fluid in the conduit to absorb, with the heat transfer working fluid, heat from the geothermal subterranean zone. The method also includes collecting energy from the heat transfer working fluid received at a surface outlet of the surface outlet wellbore.

In some implementations, the method also includes, after or during drilling the conduit, forming a plurality of deviated fluid conduits residing in the geothermal subterranean zone. The deviated fluid conduits extend from and are fluidly coupled to an intermediate portion of the conduit.

In some implementations, the plurality of deviated fluid conduits include at least one of (i) a plurality of branch wellbores or fractures extending downward from the conduit or (ii) a plurality of fins (e.g., planar fractures or other fins) extending radially away from the deviated wellbore.

Implementations of the present disclosure include a geothermal system that includes a surface inlet wellbore, a surface outlet wellbore, an interconnecting wellbore, and a plurality of fluid conduits. The interconnecting wellbore is fluidly coupled to and interconnects the surface inlet wellbore to the surface outlet wellbore. The interconnecting wellbore resides in a target geothermal subterranean zone and at least a portion of the interconnecting wellbore in the target geothermal subterranean zone is open hole. The plurality of fluid conduits are formed after or during drilling the interconnecting wellbore. The plurality of fluid conduits extend from and are fluidly coupled to an intermediate portion of the interconnecting wellbore and reside in the target subterranean zone. The interconnecting wellbore and the plurality of fluid conduits include an interface between the interconnecting wellbore and the earth of the target geothermal subterranean zone and between the plurality of fluid conduits and the earth of the target geothermal subterranean zone. The interface is configured to seal against fluid exchange between the interconnecting wellbore and the surrounding subterranean zone and between the plurality of fluid conduits and the surrounding subterranean zone.

In some implementations, the geothermal system also includes a heat exchanger residing at the surface of the surface outlet wellbore and fluidly coupled to the surface outlet wellbore. The heat exchanger is configured to convert or use energy from the heat transfer working fluid received from the surface outlet wellbore.

Implementations of the present disclosure also include a method of forming a wellbore. The method includes drilling a geothermal wellbore. The geothermal wellbore resides in a geothermal subterranean zone and at least a portion of the geothermal wellbore is open hole. The method also includes forming one or more fluid conduits in the subterranean zone. The one or more conduits extend from and are fluidly coupled to the portion of the geothermal wellbore. The method also includes disposing a first wellbore string within the geothermal wellbore. The first wellbore string defines a first annulus with the portion of the geothermal wellbore, the first annulus fluidly and thermally coupled to the one or more conduits. The method also includes disposing a second wellbore string within the first wellbore string. The second wellbore string defines a second annulus with the first wellbore string. The second annulus is configured to receive a heat transfer working fluid circulated from a surface inlet of the geothermal wellbore to a downhole end of the geothermal wellbore, and the second wellbore string is configured to receive the heat transfer working fluid circulated from the downhole end of the geothermal wellbore to a surface outlet of the geothermal wellbore. The heat transfer working fluid is configured to absorb heat from the geothermal subterranean zone as the heat transfer working fluid circulates in the downhole end of the geothermal wellbore.

In some implementations, the geothermal wellbore is a vertical geothermal wellbore. The second annulus is fluidly coupled to a bore of the second wellbore and is fluidly decoupled from the first annulus. The first annulus includes a second heat transfer working fluid configured to form a convection cell in the one or more conduits, transferring heat to the heat transfer working fluid flowing in the second annulus.

Implementations of the present disclosure include a method for recovering thermal energy in a thermally productive formation. The method includes providing an inlet and an outlet in said formation. The method also includes forming thermal energy recovery conduits disposed in a pre-determined pattern within said formation, said conduits being operatively connected with said inlet and said outlet. The method also includes providing a thermal recovery composition within said conduits for recovering thermal energy. The method also includes selecting a thermodynamic transport operation based on at least one of thermal recovery composition, formation geology and thermal gradient of said formation. The method also includes selectively inducing heat transfer within selected conduits by said selected thermodynamic transport operation. The method also includes recovering thermal energy from mobilized or quiescent thermal recovery composition (typically fluid).

In some implementations, said thermal energy recovery conduits are formed by directional drilling in said formation, creating fractures in said formation, perforating said formation, amalgamation with existing conduits (e.g., openings or other conduits) within said formation and combinations thereof to form a thermal or fluid connection with said inlet, said outlet and said energy recovery conduits.

In some implementations, the method also includes the step of increasing available heat transfer area of said thermal energy recovery conduits.

In some implementations, the method also includes the step of modifying at least some of said thermal energy recovery conduits for function as buoyancy driven convection cells. In some implementations, the method also includes the step of conditioning said energy recovery conduits for increasing thermal exchange from said formation and/or maintaining conduit integrity.

In some implementations, conditioning includes at least one of sealing said conduits, cooling said conduits, introducing proppant to maintain said conduits open with a determined permeability, modifying wettability of said conduits, fracturing said conduits and combinations thereof.

In some implementations, said thermodynamic transport operation comprises at least one of natural convection, forced convection, gravitational convection, thermal radiation, thermal conduction, and combinations thereof.

In some implementations, the method also includes the step of providing a thermal recovery composition having at least one of reactivity with said formation to form a seal at the formation interface and the energy recovery conduit, electrically conductive properties, thermally conductive properties, time release properties, phase change properties, temperature activated properties and combinations thereof.

In some implementations, the method also includes including the step of enlarging said existing conduits (e.g., openings or other conduits) within said formation utilizing a chemical unit operation, a mechanical unit operation, biological unit operation and combinations thereof in advance of, during, or after connection with said inlet and said outlet.

In some implementations, the method also includes the step of selecting said thermodynamic transport operation by at least one of determining energy recovery conduit depth within said formation, conduit dimensions, proximity to adjacent energy recovery conduits, connection to adjacent energy recovery conduits, proximity to said inlet, proximity to said outlet, composition of said thermal recovery composition and combinations thereof.

In some implementations, the method also includes the step of utilizing a plurality of different thermodynamic transport operations in a predetermined sequence in a single energy recovery conduit, a plurality of energy recovery conduits and combinations thereof. In some implementations, the method also includes the step of utilizing differing thermal transport compositions in said energy recovery conduits. In some implementations, the method also includes the step of alternating mobilization and quiescence in said plurality of energy recovery conduits.

In some implementations, the method also includes the step of inducing mobilization of said composition within an energy recovery conduit by thermal transfer from an adjacent energy recovery conduit.

In some implementations, the method also includes the step of terminating operation of said thermodynamic transport operation where mobilization of said energy recovery composition is self-sustaining.

Implementations of the present disclosure also include a method for recovering thermal energy in a thermally productive formation. The method includes providing an inlet and an outlet in said formation. The method also includes forming thermal energy recovery conduits disposed in a pre-determined pattern within said formation, said conduits being operatively connected with said inlet and said outlet. The method also include providing a thermal recovery composition within said conduits for recovering thermal energy. The method also includes selecting a thermodynamic transport operation from at least one of natural convection, forced convection, gravitational convection, thermal radiation, thermal conduction, and combinations thereof. The method also includes selectively inducing heat transfer within selected conduits by said selected thermodynamic transport operation. The method also includes recovering thermal energy from mobilized or quiescent thermal recovery composition.

In some implementations, the method also includes the step of forming a new conduit, utilizing an existing fissure crack, void and/or fracture or utilizing a formed thermal energy conduit as a thermal repository for retaining thermal energy for on demand use.

In some implementations, said repository is in at least one of thermal and fluid communication with a predetermined number of said thermal energy recovery conduits for selective dispatch of energy thereto.

In some implementations, the method also includes the step of forming a thermal repository from an enlarged existing conduit (e.g., opening or other conduit) within said formation for selective introduction into said pre-determined pattern of said thermal energy recovery conduits.

In some implementations, the method also includes the step of conditioning said repository.

Implementations of the present disclosure also include a method for recovering thermal energy in a thermally productive formation. The method includes forming thermal energy recovery conduits disposed in a pre-determined pattern within said formation with an inlet and outlet. Said conduits are operative with said inlet and said outlet by at least one of fluid connection, direct heat exchange, indirect heat exchange and combinations thereof. The method also includes providing a thermal recovery composition within said conduits for recovering thermal energy. The method also includes selecting a thermodynamic transport operation based on at least one of conduit dimensions, thermal recovery composition, formation geology, thermal gradient of said formation and the operative relationship of said conduits with said inlet and said outlet. The method also includes selectively inducing heat transfer within selected conduits by a selected thermodynamic transport operation. The method also includes recovering thermal energy from mobilized or quiescent thermal recovery composition.

In some implementations, the method also includes the step of connecting a plurality of inlets of conduits together in common and a plurality of outlets of conduits together in common to provide a converged inlet and a converged outlet suitable for closed loop connection with an energy conversion device.

In some implementations, the method also includes the step forming a thermal repository at a predetermined location in said formation in thermal or fluid connection with at least one of said converged inlet and said converged outlet.

DETAILED DESCRIPTION

The present disclosure describes geothermal systems that include geothermal wells with fluid conduits that increase a heat transfer surface area of the well and increase a rate of heat transfer. The geothermal wells can have fluid conduits that form convection cells to heat the fluid in the wellbore. The geothermal well can also have fins (e.g., planar fractures or other fins) that increase a thermal conductivity of the geothermal well.

A technical challenge of some geothermal wells is that conductive heat transfer takes approximately 30 years to partially mine a 40 square meter volume around a given wellbore. The rate of heat transfer can be increased by appending fluid conduits to a geothermal well to extract more heat energy from the earth (e.g., rock or other earthen formations) for relatively low cost. Forming such conduits can enhance the geothermal process by utilizing convective heat transfer (e.g., natural convection, forced convection, or gravitational convection) instead of pure conductive heat transfer through the earth during circulation of a heat transfer working fluid in the well. Additionally, such conduits can be arranged as fins to increase the thermal conductivity of the geothermal well.

Figure 1:
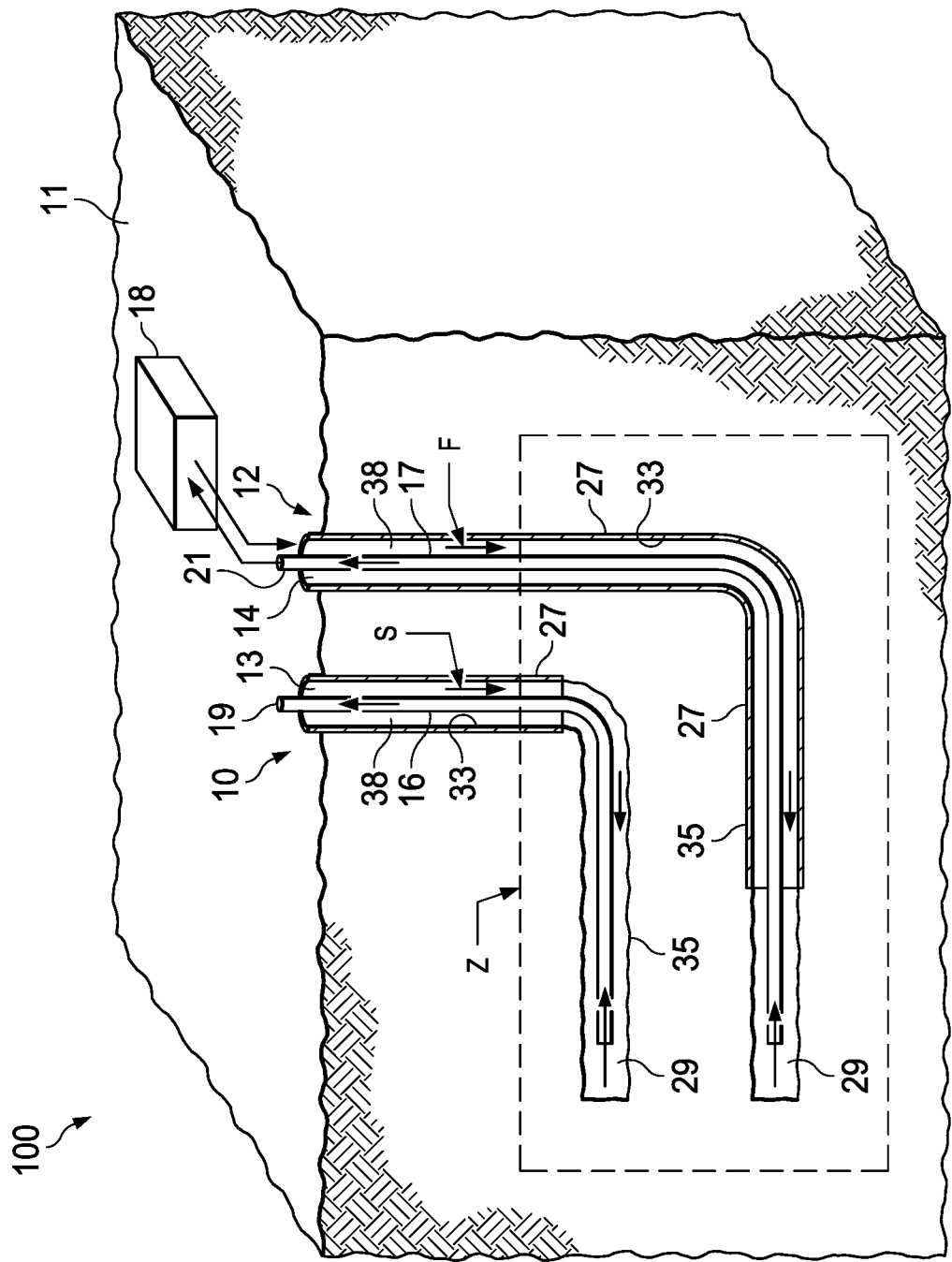
FIG. 1 is a perspective schematic view of a geothermal system according to a first implementation of the present disclosure.

FIG. 1 shows a geothermal system 100 (e.g., a closed loop geothermal system) that includes a first geothermal well 10 and a second geothermal well 12. The first geothermal well 10 is spaced apart and above the second geothermal well 12. In some implementations, the wells 10 and 12 can be arranged side by side or vertically offset from each other. The wells 10 and 12 can be existing wells (e.g., wells previously used for oil and gas production) or wells drilled for geothermal purposes. Each well 10 and 12 is shown as including a vertical surface wellbore 33 and a deviated wellbore 35, but the wells 10 and 12 can be vertical wells without deviated or non-vertical sections. The first well 10 has a casing 27 in the vertical wellbore 33 and a deviated wellbore 35 with an open hole 29. The second well has casing 27 in its vertical section 33 and part of its horizontal section 35. The remaining part of the horizontal wellbore 35 is open hole.

The deviated wellbore 35 can include any type of non-vertical or lateral wellbore such as a horizontal wellbore or a slanted wellbore. The deviated wellbore 35 is fluidly coupled to a surface wellbore. The deviated wellbore 35 can be drilled with directional drilling equipment such as whipstocks, special bottom hole assemblies, and rotary steerable systems.

Each well 10 and 12 is in thermal contact within a target geothermal subterranean zone "Z." For example, the deviated wellbores 35 can reside in the target subterranean zone "Z." The target geothermal subterranean zone "Z" can include one, a portion of one, or multiple thermally productive formations or subterranean layers. The target geothermal subterranean zone "Z" is a zone underneath the earth's surface 11 that has a thermal gradient suitable for geothermal energy production.

The first well 10 includes a wellbore string 16 disposed within the well 10. The second well 12 includes a second wellbore string 17 disposed within the well 12. Different fluids can be circulated in each well 10 and 12 to seal the wells (e.g., form an impermeable interface), increase a thermal conductivity of the wells, or recover heat energy from the target geothermal subterranean zone "Z." For example, a sealant "S" is circulated from a surface inlet 13 of the first well 10 to a downhole end of the well, and from the downhole end, through the wellbore string 16 to a surface outlet 19 of the wellbore string 16. The surface inlet 13 is an inlet of an annulus 38 defined between the wellbore string 16 and a wall of the wellbores 33 and 35. The surface outlet 19 is a fluid outlet of the wellbore string 16. As further described in detail below with respect to FIG. 3B, the sealant "S" forms an interface that seals against (e.g., limits or wholly prevents) fluid exchange between the well 10 and the surrounding subterranean zone "Z." In some implementations, a thermally conductive fluid can be flown in addition to or instead of the sealant "S" to form a thermally conductive interface in the well. In some implementations, the sealant "S" can have thermally conductive properties to form an impermeable and thermally conductive interface.

After sealing and commissioning the second well 12, a heat transfer working fluid "F" is circulated in the well 12 from a surface inlet 14 of the well 12 to a surface outlet 21 of the well 12. The surface inlet 14 is an inlet of the annulus 38 of the second well 12, and the surface outlet 21 is a fluid outlet of the wellbore string 17. The heat transfer working fluid "F" 'absorbs' heat from the subterranean zone "Z" as the heat transfer working fluid "F" flows through the deviated wellbore 35.

At the surface 11 of the wellbore, a facility 18 (e.g., an energy collection facility) can collect energy from the heat transfer working fluid "F" received from the outlet 21 of the well 12. The facility 18 can convert or use the thermal (and kinetic) energy of the fluid to generate electricity, produce mechanical work, heat a facility, or for another related purpose. For example, the facility 18 can include a steam turbine, a heat exchanger, a filtration system, and other fluid handling equipment. As further described in detail below with respect to FIG. 14, each or one of the wells 10 and 12 can include a tube-in-tube-in-wellbore configuration in which the thermal recovery working fluid in the wellbore strings is isolated from a geothermal fluid in the wellbore.

Figure 2:
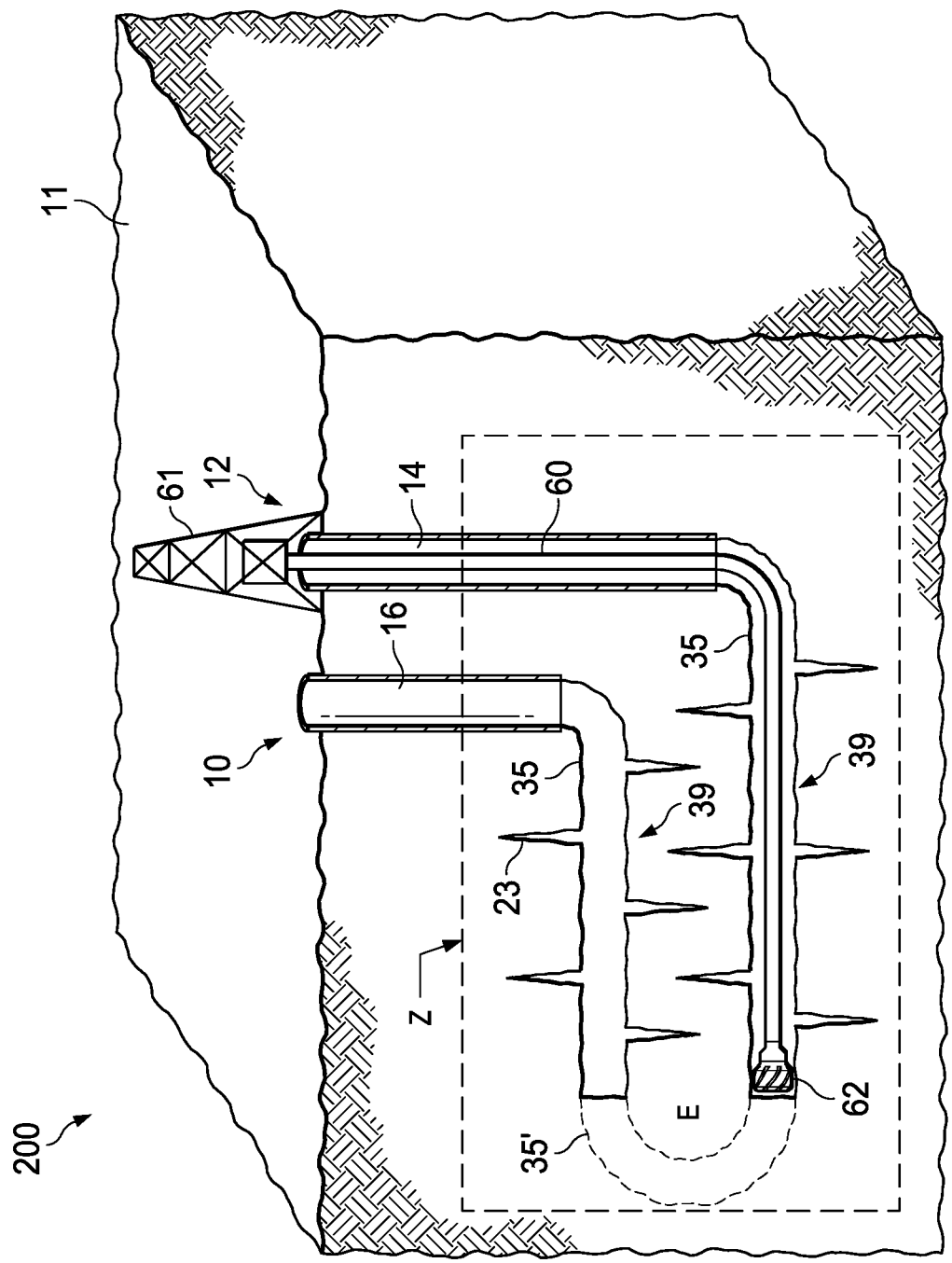
FIG. 2 is a perspective schematic view of a geothermal system according to a second implementation of the present disclosure.

FIG. 2 shows the construction of a geothermal system 200 similar to the geothermal system 100 in FIG. 1, with the main exception that the geothermal wells 10 and 12 have fluid conduits 23. The geothermal system 200 can be arranged with wellbore strings as shown in FIG. 1, or without the wellbore string, as shown below with respect to FIGS. 3-6. The well 10 and 12 can be drilled with a drill string 60 connected to and driven by a rig 61 at the surface 11. The drill string 60 includes a drill bit 62 at the end of the string 60. As further described in detail below with respect to FIGS. 4A and 4B, the two wells 10 and 12 can be connected by a conduit or wellbore 35' that connects the toes of each well 10 and 12. For example, the same drill string 60 can be used to drill a connection between the two wells 10 and 12, or a vertical wellbore from the surface can be drilled to connect the two wells 10 and 12.

The wells 10 and 12 have multiple fluid conduits 23 that are formed after or during drilling the deviated wellbore 35. For example, the conduits 23 can be formed in a fracturing process (i.e., they can be man-made fractures) and/or perforating process after the deviated wellbore 35 is drilled, the conduits can be drilled together with or after the drilling of the deviated wellbore 35, the conduits 23 can be formed after the geothermal well has been commissioned and used for heat recovery (e.g., as a remediation, workover, and/or retrofit operation) or the conduits 23 can be formed in another manner after or during drilling the deviated wellbore 35. The fluid conduits 23 reside in the subterranean zone "z." The fluid conduits 23 extend from and are fluidly coupled to an intermediate portion 39 of each deviated wellbore 35. The fluid conduits 23 can be formed, for example, by drilling (e.g., directional drilling), perforating, or fracturing the earth "E" of the geothermal zone "Z." The fluid conduits 23 can be formed by expanding pre-existing fractures, cracks, fissures, or voids, or by drilling new conduits deviated from the horizontal wellbore 35.

The fluid conduits 23 can extend downward, upward, sideways, sloped or in another direction with respect to the deviated wellbore 35. The fluid conduits 23 can be sealed with the sealant "S" shown in FIG. 1. In some implementations, as further described in detail below with respect to FIG. 3C, during geothermal energy production, the heat transfer working fluid "F" (shown in FIG. 1) is circulated in the wells 10 and 12 to flow into the fluid conduits 23 to form convection cells. Additionally, the fluid conduits 23 can be filled or their walls coated with a conductive material to increase the thermal conductivity of the wells 10 and 12. The geothermal zone "Z" can transfer fluid to the heat transfer working fluid in the wellbore 35 through natural convection, forced convection, gravitational convection, or thermal radiation (each of these forms of heat transfer also referred to as thermodynamic transport operations). For example, to induce gravitational convection, the density of the heat transfer working fluid "F" can be increased to facilitate the fluid falling in the downwardly extending conduits 23 to provide gravitational convection and drive heat transfer from the conduits.

Figure 3A:
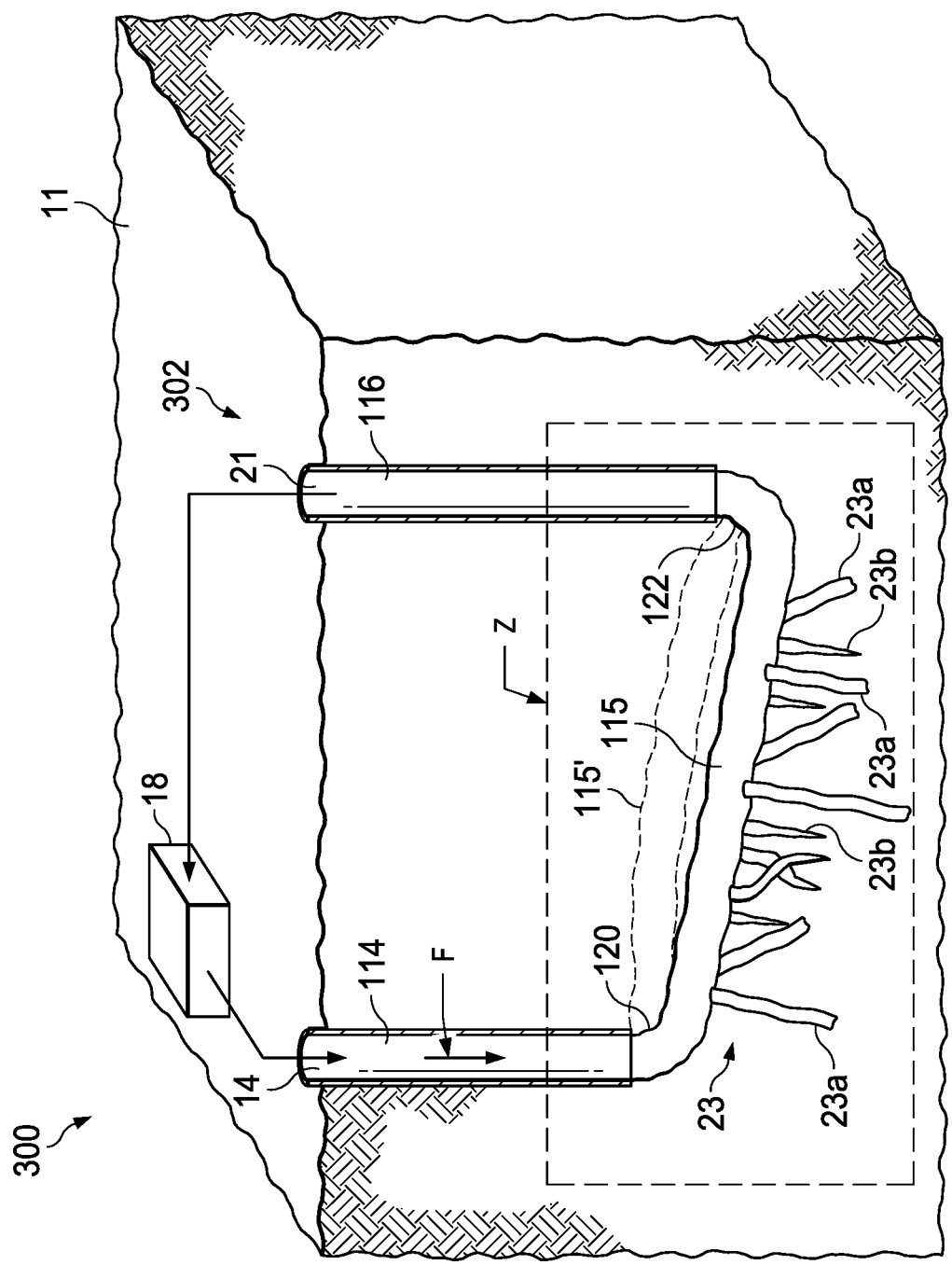
FIG. 3A is a perspective schematic view of a geothermal system according to a third implementation of the present disclosure.

FIG. 3A shows a geothermal system 300 that includes a U shaped geothermal well 302. The U shaped geothermal well 302 (e.g., a closed loop geothermal well) includes a surface inlet wellbore 114, a surface outlet wellbore 116, and a deviated, interconnecting wellbore 115 that is fluidly coupled to and interconnects the surface inlet wellbore 114 to the surface outlet wellbore 116. The heat transfer working fluid "F" (and/or the sealant "S" and/or another fluid) circulates from the fluid inlet 14 of the inlet wellbore 114, down to the interconnecting wellbore 115, through the fluid conduits 23, and up the surface outlet wellbore 116. The heat transfer working fluid "F" flows out of the well 302 through the fluid outlet 21 of the outlet wellbore 116, from which the fluid can be directed to the surface facility 18. From the surface facility, the heat transfer working fluid "F" can return to the inlet 14 of the well 302 to begin a new geothermal cycle. As further described in detail below with respect to FIG. 5, the U shaped well 302 can include a second interconnecting wellbore 115' or more than two interconnecting wellbores that are similar to the interconnecting wellbore 115. The multiple interconnecting wellbores extend from (e.g., directly from or from near) the first junction 120 to (e.g., directly to or near) the second junction 122, and are fluidly coupled to the surface inlet wellbore 116 and the surface outlet wellbore 114.

All or a portion of the interconnecting wellbore 115 is open hole. For example, in certain instances, the majority of the interconnecting wellbore 115 is open hole. In certain instances, a portion of the wellbore is lined or cased at a location needing support. In certain instances, the surface inlet wellbore 114 can be cased from the surface 11 to above a first junction 120 between the surface inlet wellbore 114 and the deviated wellbore 115. Similarly, the surface outlet wellbore 116 can be cased from the surface 11 to above a second junction 122 between the surface outlet wellbore 114 and the deviated wellbore 115. Each junction 120 and 122 is similar to a heel of a non-vertical wellbore, fluidly connecting the vertical wellbore 116 and 114 to the deviated wellbore 115. In certain instances, the junctions 120, 122 can be left open hole.

Figure 3B:
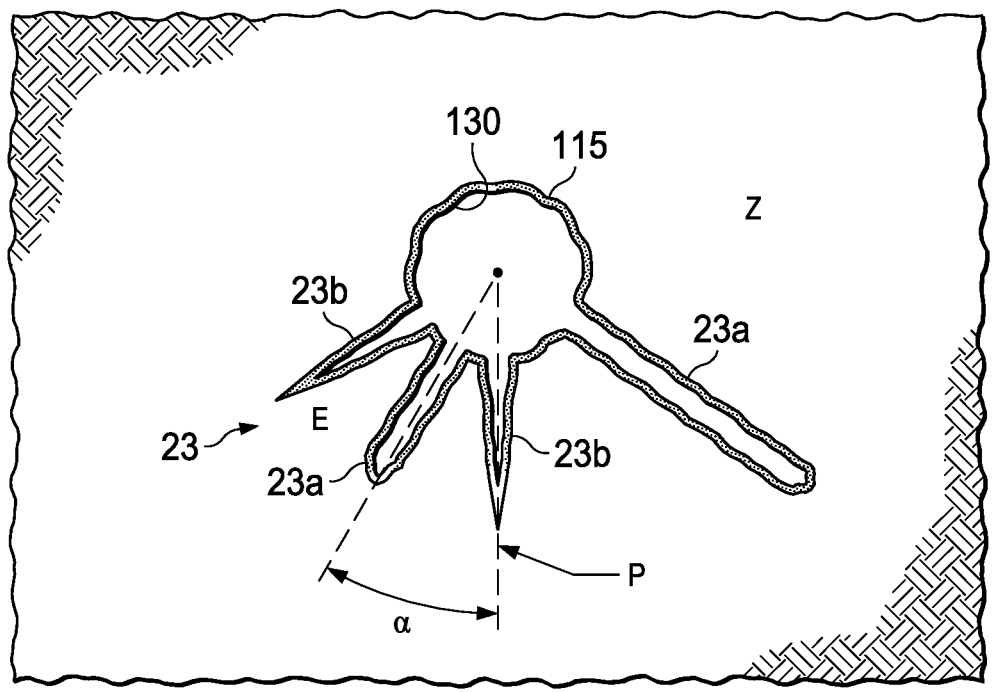
FIG. 3B is a front cross-sectional view of a section of the well in FIG. 3A.

Referring also to FIG. 3B, the fluid conduits 23 can be formed of different shapes and dimensions. For example, each conduit can be a branch wellbore 23a or a fracture 23b that extends from the deviated wellbore 115. The branch wellbores 23a and the fractures 23b can extend downward (e.g., vertically downward or at an angle) from the interconnecting wellbore 115. For example, one or more of the fluid conduits 23 can be a slanted conduit, extending at an angle "a" from a vertical plane "P" that extends along a longitudinal central axis of the interconnecting wellbore 115. The angle "a" can be, for example, 10-15 degrees. The conduits 23 can have a diameter similar to, larger than, or smaller than the diameter of the interconnecting wellbore 115. The conduits 23 can extend, for example, from 0.5 m to 20 m (e.g., the fractures about 1.5 m and the branch wellbores about 9 m) or more into the earth. The interconnecting wellbore 115 can include, for example, between 3000 and 1000 (e.g., 5000) fluid conduits 23.

Each conduit 23 is sealed with the sealant "S" (shown in FIG. 1) that forms an interface 130. The sealant "S" can include a fluid with a proppant, or with sealant particles such as bentonite or wettability agents. A wetting agent can be used to enable phase blocking of the working fluid "F" and to keep the fluid from leaking out of the conduits. A proppant can be used to maintain the conduits open with a determined permeability.

The interface 130 is formed between the deviated wellbore 1150 and the earth "E" of the subterranean zone "Z," and also between the fluid conduits 23 and the earth "E" of the subterranean zone "Z." For example, the sealant "S" is circulated in the interconnecting wellbore 115 and through the conduits 23 to form a layer that seals against (e.g., limits or wholly prevent)s fluid exchange between the earth "E" of the subterranean zone "Z." The interface 130 can be impermeable or substantially impermeable to fluids. In some implementations, substantially impermeable refers to the interface 130 having a permeability lower than the surrounding earth "E." For example, the interface 130 can have a permeability of less than 10 mD. The fluid conduits 23 can be open hole such that the only layer between the conduit and the earth "E" is the interface 130. The seal is maintained during circulation of the heat transfer working fluid "F." Additionally, the conduits 23 can be sealed with a mechanical or biological treatment to achieve the same sealing effect.

As shown in FIG. 3A, the interface can extend from the first junction 120 to the second junction 122. For example, each junction 120 and 122 and the interconnecting wellbore 115 can be open hole, with the interface preventing or mitigating fluid exchange between the junctions and the subterranean zone "Z," between the interconnecting wellbore 115 and the subterranean zone "Z," and between the fluid conduits 23 and the subterranean zone "Z."

Figure 3C:
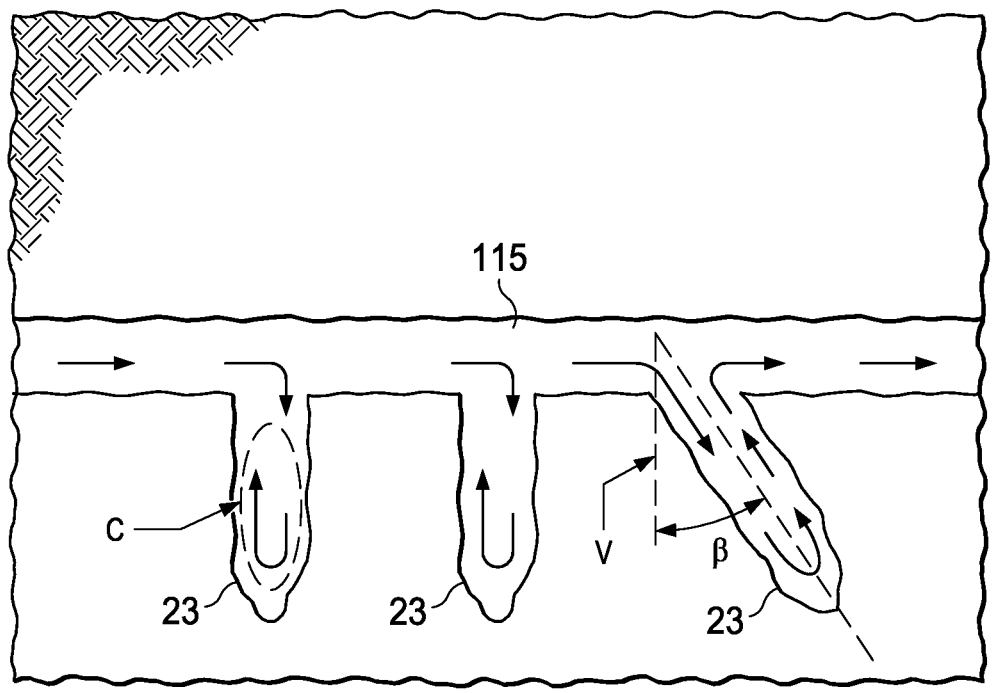
FIG. 3C is a side schematic view of a group of convective cells.

Referring now to FIG. 3C, the heat transfer working fluid "F" can form a convection cell "C" in the fluid conduits 23. For example, the fluid conduits 23 can extend to a depth at which the surrounding earth is hotter than the earth surrounding the interconnecting wellbore 115. Specifically, the interconnecting wellbore 115 can reside in a first portion of the subterranean zone "Z" that has a first temperature and the fluid conduits 23 can extend to a second portion of the subterranean zone "Z" that has a second temperature greater than the first temperature. The temperature differential allows the fluid in the conduits 23 to heat to a temperature greater than the temperature of the fluid in the interconnecting wellbore 115. During circulation of the working fluid "F," a portion of the fluid "F" flows into the fluid conduits 23 (e.g., the branch wellbores), generating the buoyancy-driven convection cell "C" in the fluid conduits 23. In the convection cells "C," the heat transfer working fluid "F" in the conduit 23 heats up (getting lighter) and rises to the interconnecting wellbore 115 due to buoyancy. If there is fluid "F" in the interconnecting wellbore 115, the fluid risen from the conduits can transfer heat to the working fluid "F" in the deviated wellbore.

The convection cells "C" can be generated and changed based on fluid parameters of the working fluid "F" and based on the dimensions and orientation of the fluid conduits 23. For example, the fluid conduits 23 can be slanted at an angle "p" with respect to a plane "N" orthogonal with respect to a length of the wellbore 115. The angle "3" can be, for example, between 5 and 15 degrees (e.g., 10 degrees). The angle of the slanted fluid conduit 23 can help generate a segregated flow that prevents the fluid from 'choking' and improves the flow of the fluid in and out of the conduits 23. Specifically, the conduit at an angle prevents the fluid "F" from filling the opening at the top of the conduit 23, which prevents the fluid "F" from forming a vacuum that is stronger than the force of gravity, which can prevent the fluid from flowing smoothly into the conduit 23. In such convection cells "C," the colder fluid flows down along the 'bottom' of the slanted conduit 23, and the hotter fluid flows up along the 'top' of the slanted conduit 23.

Furthermore, the density or weight of the working fluid "F" can be high enough to induce the flow of the fluid, by gravity, into the fluid conduits 23. Additionally, if the conduits 23 have low flow capacity but high volume and surface area (e.g., thin fractures) gravitational convection can be used to induce or increase convection in the fluid conduits 23. For example, a fluid with heavier density can be placed at the top section of the conduit 23 and allow the heavier density fluid to descend with gravity, displacing the lighter fluid within the conduit 23. Multiple fluids of increasingly heavier density may be placed at the top of a conduit 23 so as to extend the effect over many years.

Additionally, turbulence caused by a relatively high flow rate (e.g., a Reynolds number greater than 2,000) in the interconnecting wellbore 115 can allow the fluid "F" to improve a heat transfer to the fluid and reduce a thermal resistance of the convection cells "C." Furthermore, the working fluid "F" can include a large thermal expansion coefficient (e.g., a thermal expansion coefficient greater than $5 \times 10^{-4}$ $K^{-1}$), phase change materials, and a low viscosity (e.g., a viscosity of less than 1 cP) to improve the heat transfer.

A large thermal expansion coefficient allows the fluid "F" to decrease in density faster as the fluid "F" absorbs heat. This density differential increases the buoyancy force, which can increase the flow rate and thus increase the rate of heat transfer. The flow of the heat transfer fluid "F" into the conduits 23 can be dictated by the balance between hydraulic pressure drop (i.e., from turbulence) and buoyancy force. Thus, a high thermal expansion leads to a larger buoyancy force, which leads to a higher flow rate through the convection cell. Similarly, low viscosity leads to smaller hydraulic pressure drop, which leads to higher flow rate circulating through the convection cell.

The working fluid "F" can also have electrically conductive properties, thermally conductive properties, and temperature activated properties to increase the rate of heat transfer. In addition to changing the parameters of the fluid "F" to increase the rate of heat transfer, the working fluid "F" can have other properties to maintain the seal such as reactivity properties to react with the earth and form a seal at the interface, time release properties, or phase change properties.

The convection cells "C" can transfer more heat to the working fluid "F" as compared to a wellbore that relies only on conductive heat transfer. For example, in convection, the movement of fluid particles causes the kinetic energy of the fluid to be higher than in conduction, which in turn can result in a higher rate of heat transfer as compared to conductive heat transfer.

In some implementations, instead of circulating the fluid "F" in the wellbore, the fluid "F" can be generally quiescent rather than mobilized. For example, the fluid conduits 23 can be filled with a substance or with additives that have a high thermal conductivity, such as graphene or graphite. Such substance can transfer heat to the fluid in the wellbore, which can then be collected at the surface.

In some implementations, valves, packers, and other flow control equipment can be used in the well (e.g., in the wellbore 115 or in the conduits 23) to selectively turned off and on sections of the well or a number of conduits. In some implementations, the working fluid "F" can be circulated in the well using a surface pump until circulation is self-sustaining. For example, the well can be configured to generate a thermosiphon effect such that the working fluid "F" flows to the surface when heated in the geothermal zone without the use of a pump.

Figure 4:
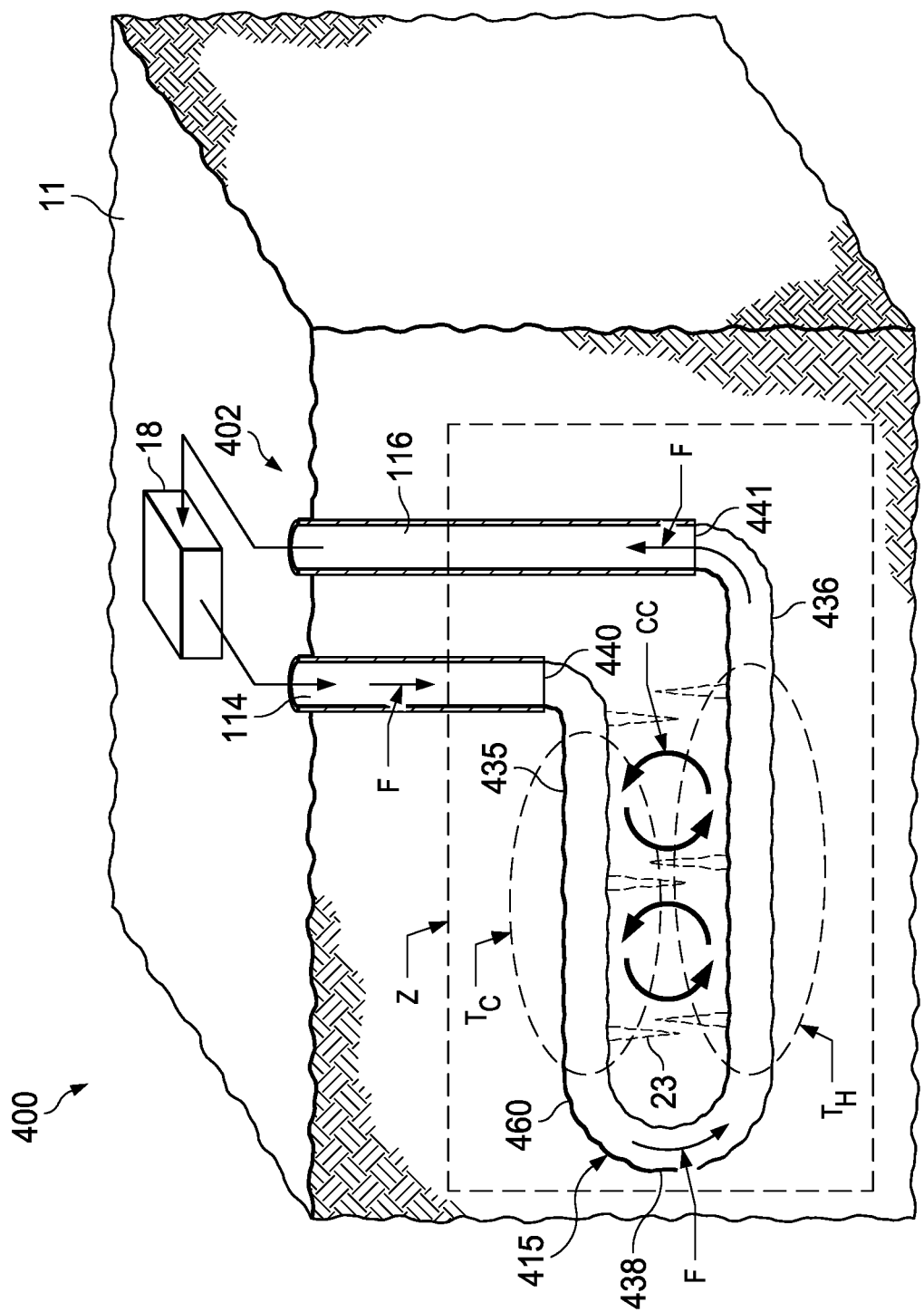
FIG. 4 is a perspective schematic view of a geothermal system according to a fourth implementation of the present disclosure.

FIG. 4 shows a geothermal system 400 that includes a surface facility 18 and a closed loop geothermal well 402. The closed loop geothermal well 402 generates a convection cell or a convection current "CC" between two lateral wellbores of the geothermal well 402. The geothermal well 402 includes a surface inlet wellbore 114, a surface outlet wellbore 116, and a conduit or wellbore 415 that is fluidly coupled to and interconnects the surface inlet wellbore 114 to the surface outlet wellbore 116. The conduit 415 resides in a geothermal subterranean zone "Z." At least a portion of the conduit 415 in the geothermal subterranean zone "Z" is open hole.

The conduit 415 includes two 'stacked' laterals relatively close to each other to generate a convection current between the two. For example, the conduit 415 includes a first lateral wellbore 435 fluidly coupled to and extending from a downhole end 440 of the surface inlet wellbore 114 to a toe 460 of the first lateral wellbore 435. The conduit 415 also includes a second lateral wellbore 436 fluidly coupled to and extending from a downhole end 441 of the surface outlet wellbore 116 to the toe 460 of the first lateral. In some implementations, a junction wellbore 438 can connect the two ends of the lateral wellbores 435 and 436. The second lateral wellbore 436 resides below the first lateral wellbore 135 such that circulation of the heat transfer working fluid "F" generates the convection cell "CC" that transfers heat through convection from the second lateral wellbore 436 to the first lateral wellbore 435. The first lateral wellbore 435 can reside directly above or vertically offset with respect to the second lateral wellbore 436.

Different dimensions, placement, and a distance between the lateral wellbores 435 and 436 can be selected to generate the convection current. For example, the lateral wellbores 435 and 436 can be spaced apart from each other a distance of between 10 m to 500 m to generate the convection current. The lateral wellbores 435 and 436 can have fluid conduits 23 on a common side (e.g., facing each other) to aid in the generation of the convection current. For example, the first lateral wellbore 435 resides in a relatively cold zone Tc and the second lateral wellbore 435 resides in a relatively hot zone TH (e.g., deeper and hotter than the first zone), such that the fluid "F" in the second lateral wellbore 436 rises in the fluid conduits 23 to transfer heat to the fluid conduits 23 of the first lateral wellbore 435, heating the fluid "F" in the first conduit 435. Specifically, the fluid "F" in the fluid conduits 23 of the second lateral wellbore 436 forms a relatively hot convection cell in which the hot fluid flows upward, heating the earth below or adjacent the fluid conduits 23 of the first lateral wellbore 435. The colder fluid in the convection cells of the second lateral wellbore 436 flows down to the second lateral wellbore 436. The heat absorbed by the fluid conduits 23 of the first lateral wellbore 435 increases the temperature of its convection cells, allowing the fluid to heat the fluid "F" in the first lateral wellbore 435. The convection current "CC" can increase the rate of heat transfer from the geothermal subterranean zone "Z" to the fluid "F."

In some implementations, the well 402 can be constructed without conduits 23, using the porosity of the earth, pre-existing fractures, cracks, fissures, voids, or a combination of these to generate the convection current "CC."

Figure 5:
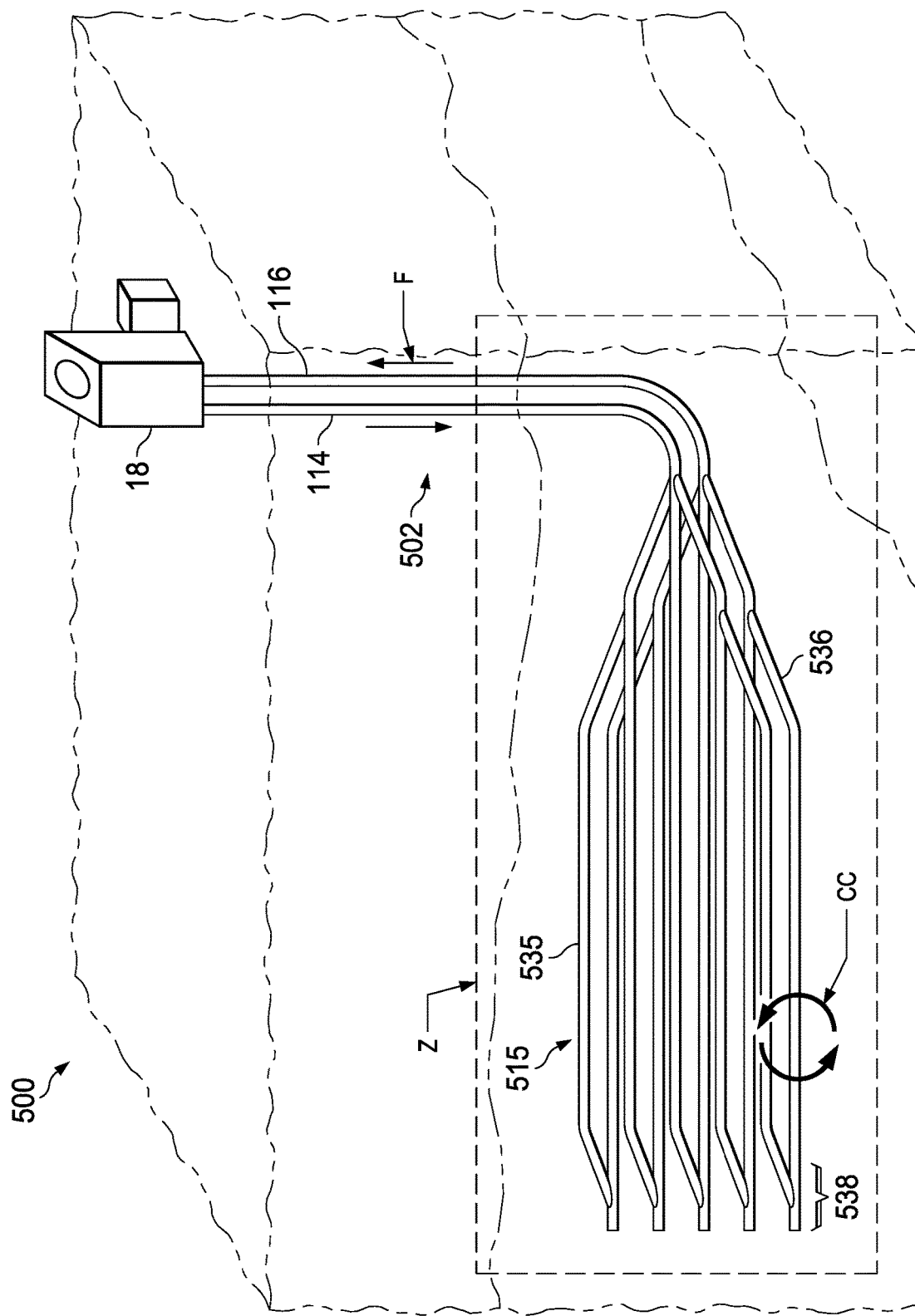
FIG. 5 is a perspective schematic view of a geothermal system according to a fifth implementation of the present disclosure.

FIG. 5 shows a geothermal system 500 that includes a surface facility 18 and a closed loop geothermal well 502 similar to the geothermal well 402 in FIG. 4, with the main exception of having multiple lateral wellbores in a stacked configuration. The geothermal well 502 includes a surface inlet wellbore 114, a surface outlet wellbore 116, and multiple conduits or wellbores 515 that are fluidly coupled to and interconnect the surface inlet wellbore 114 to the surface outlet wellbore 116. The conduits 515 resides in a geothermal subterranean zone "Z." At least a portion of the conduits 515 are open hole. The conduits 515 include a first group of lateral wellbores 535 and a second group of lateral wellbores 536 residing below the first group of lateral wellbore 535. The first group of lateral wellbores 535 extend from the surface inlet wellbore 114 and meet at a respective toe 538 of each lateral wellbore. The second group of lateral wellbores 536 extend from the surface outlet wellbore 116 to the respective toes 538 of the first group of lateral wellbores 535. Similar to the geothermal well in FIG. 4, the groups of lateral wellbores 535 and 536 can include fluid conduits facing each other (or natural fractures or similar formation characteristics) in which convection cells are generated to transfer heat from the second group of lateral wellbores 536 to the first group of lateral wellbores 535.

Figure 6A:
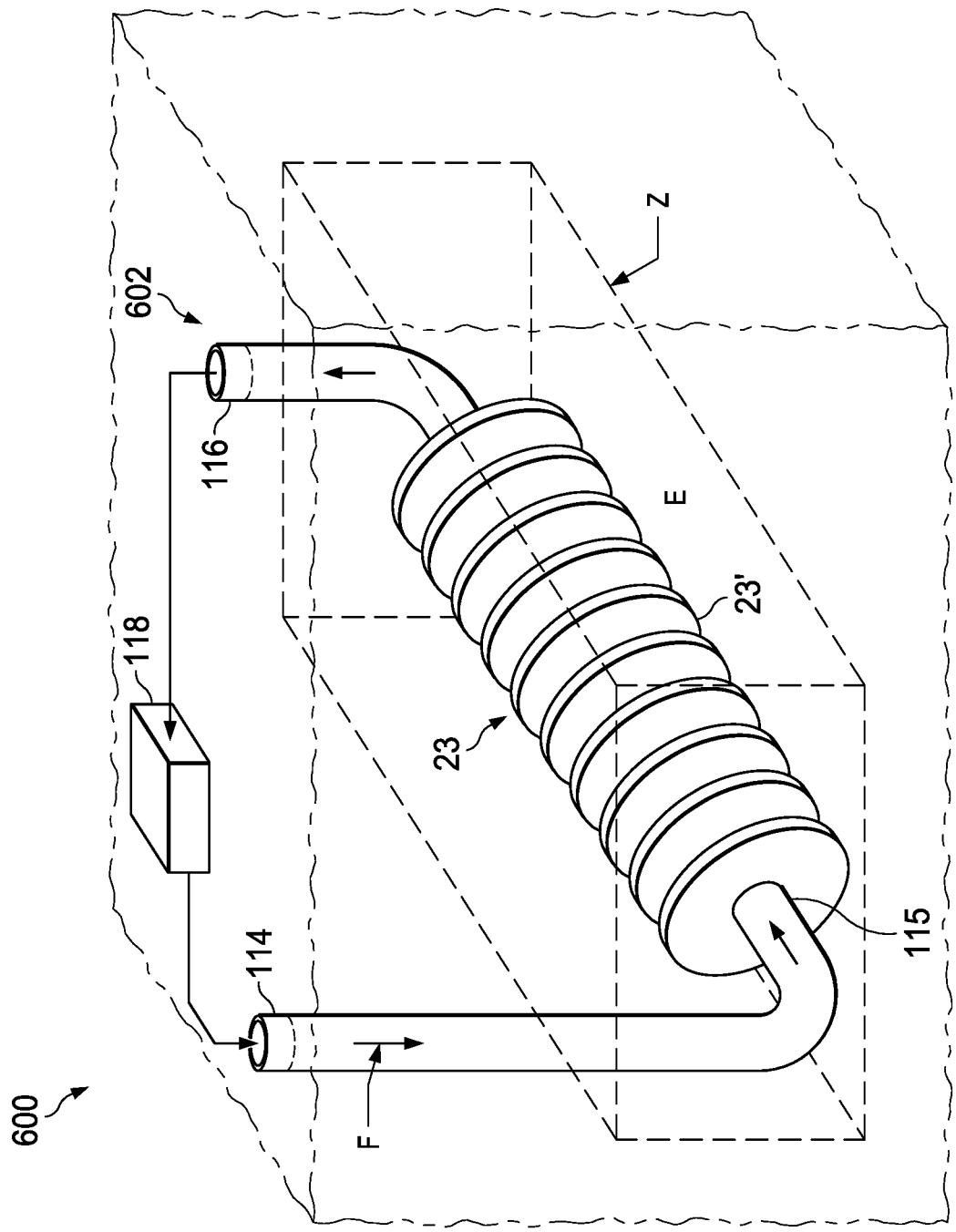
FIG. 6A is a perspective schematic view of a geothermal system according to a sixth implementation of the present disclosure.
Figure 6B:
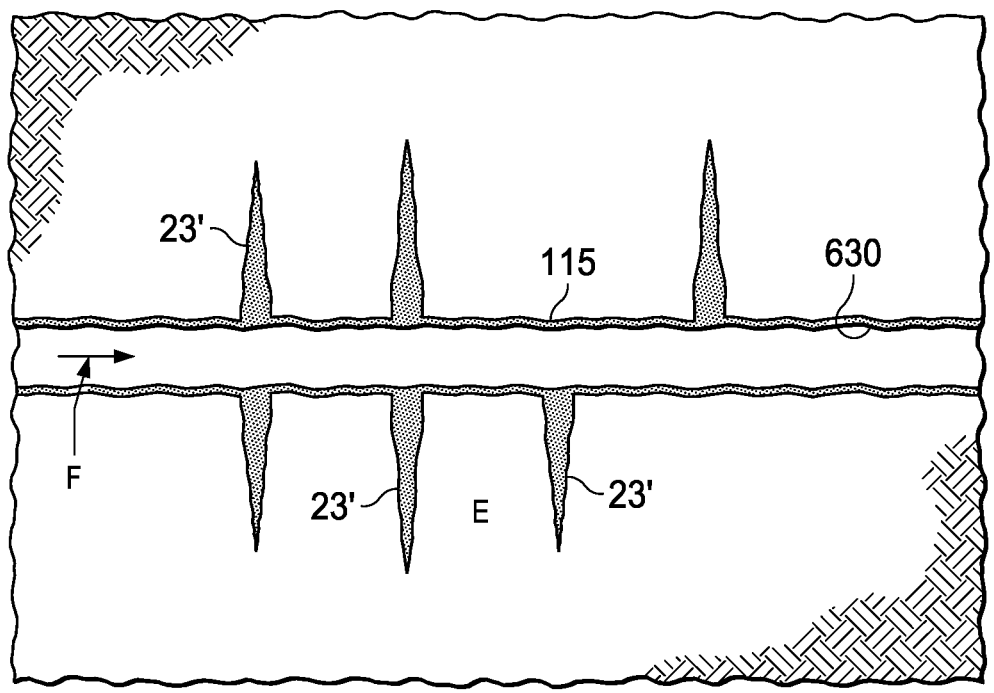
FIG. 6B is a side cross-sectional view of a section of the well in FIG. 6A.

FIGS. 6A and 6B show a geothermal system 600 that includes a surface facility 18 and a geothermal well 602 that has fluid conduits 23 in the form of planar fractures 23'. As shown in FIG. 6A, the geothermal well 602 includes a surface inlet wellbore 114, a surface outlet wellbore 116, and an interconnecting wellbore 115. The interconnecting wellbore 115 has thin planar fractures 23' that extend radially away from the deviated wellbore 115. As shown in FIG. 6B, the planar fractures can extend along the entire circumference of the wellbore 115 or only along a section of the circumference of the wellbore 115 (e.g., planar fractures extending downwardly or upwardly). The planar fractures 23' can be partially or entirely filled with a thermally conductive material that forms a thermally conductive interface 630. To form the interface, a fluid (e.g., iron infused cement or a sealant with thermally conductive particles) is circulated in the geothermal well 602. The fluid can be circulated until the thermally conductive interface 630 forms between the deviated wellbore 115 and the earth "E" of the geothermal subterranean zone "Z."

The thermally conductive interface 630 has a conductivity greater than the earth "E" of the subterranean zone "Z". For example, the thermally conductive interface 630 can have a thermal conductivity of about 10 W/m-K and the surrounding earth "E" can have a thermal conductivity of about 2.5 W/m-K. The interconnecting wellbore 115 can have, for example, hundreds or thousands of planar fractures 23' distributed along the length of the wellbore 115. Filled with the conductive material, the planar fractures 23' can act as fins on a radiator, increasing the surface area of the conductive heat transfer and increasing the rate of heat transfer. In some implementations, the thermally conductive interface 630 can be a thin layer that does not fill the planar fractures 23' to allow the working fluid "F" to flow into the fractures 23'.

The planar fractures 23' can increase a convective resistance relative to a conductive resistance. In other words, the thermally conductive fractures 23' can cause convective resistance to become the governing thermal resistance in the interconnecting wellbore 115. To mitigate the convective thermal resistance in the wellbore, a designer or operator can change parameters of the working fluid "F" or configure the well in a manner to mitigate convective thermal resistance or both. For example, the interconnecting wellbore 115 can have a relatively small diameter (e.g., a diameter of less than 8.5 inches). Additionally, the wellbore 115 can have a tortuous fluid path to increase turbulence in the fluid "F." Furthermore, the wellbore 115 can have an insert (e.g., a helical insert) that induces turbulence in the fluid "F." Additionally, the working fluid "F" can be circulated with relatively high turbulence (e.g., a Reynolds number greater than 2,000) in the wellbore 115, or the working fluid "F" can have a relatively high thermal conductivity (e.g., a thermal conductivity greater than 0.6 W/m-K), or the working fluid "F" can have a relatively low viscosity (e.g., a viscosity less than 1 cP).

Figure 7:
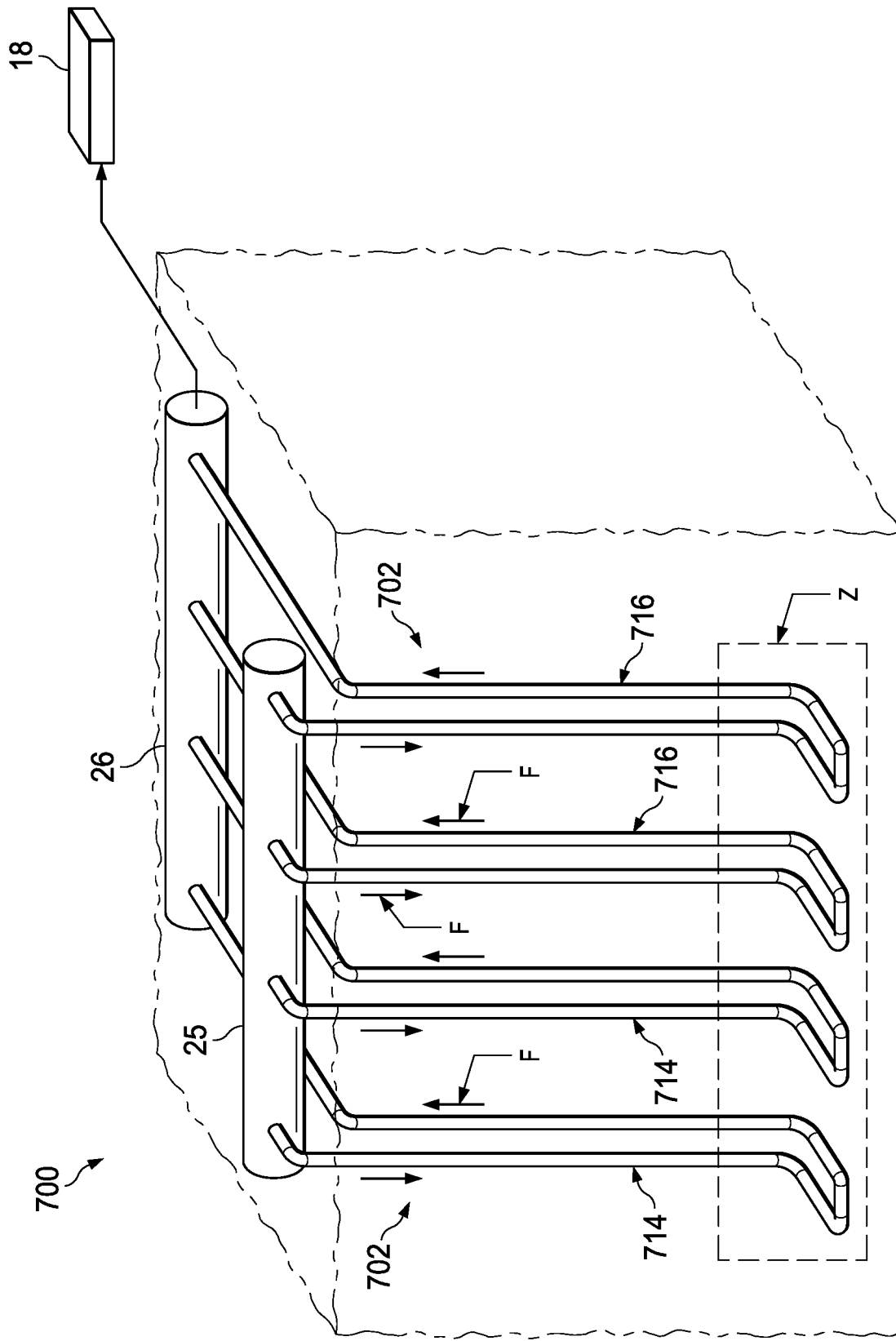
FIG. 7 is a perspective schematic view of a geothermal system according to a seventh implementation of the present disclosure.

FIG. 7 illustrates a geothermal system 700 that includes a group of wells or conduits 702 fluidly coupled to surface manifolds 25 and 26. Each well 702 includes an inlet wellbore 714 and an outlet wellbore 716. The inlet wellbores 714 are commonly connected at surface manifold 25 and the outlet wellbores 716 are commonly connected at manifold 26 to allow for collective recovery of thermal energy. For example, the geothermal system 700 can be used when geographic footprint constraints are not an issue or where the gradient dispersion within the zone "Z" requires the wells 702 to be separated a large distance from each other.

Figure 8:
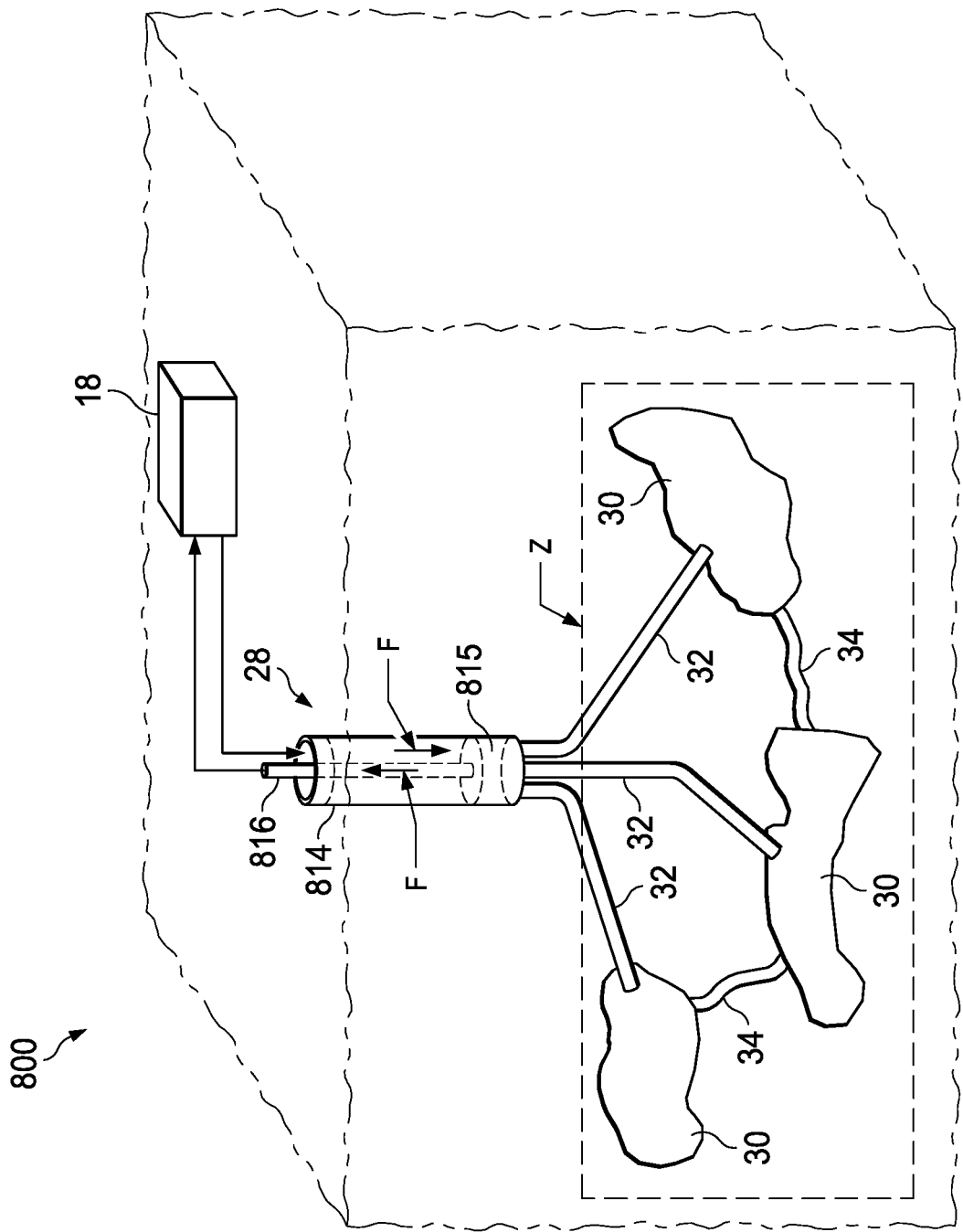
FIG. 8 is a perspective schematic view of a geothermal system according to an eighth implementation of the present disclosure.

FIG. 8 shows a geothermal system 800 that includes a surface conduit or wellbore 28 with a concentric tube-in-tube configuration and multiple wellbores or conduits 32 extending from the conduit 28 to subterranean voids 30 residing in a subterranean zone "Z." The conduit 28 is in fluid communication, though the deviated conduits 32, with the voids 30. The voids 30 can be naturally occurring or induced formation voids. The surface conduit 28 includes a first tube 814 (e.g., a wellbore casing) and a second tube 816 (e.g., a wellbore string) disposed inside the first tube 814. In some implementations, the tubes 816 and 814 can be separate from each other. The deviated conduits 32 can be attached to the surface conduit 28 through a manifold 815 attached to the conduit 28. The deviated conduits 32 can also include tube in-tube configurations to supply and return the working fluid "F" within the same conduit 32, or one conduit 32 can be used to supply the working fluid "F" to a void 30, and another conduit 32 fluidly coupled to the same void 30 can be used to return the heated fluid "F." The working fluid "F" can be used as a flush to flush out thermally charged fluid in the voids 30 to induce forced convection heat transfer to the fluid "F."

Additionally, different fluids having different densities can be used to change a residency time of the fluid "F" in the void 30 to induce buoyancy-driven convection heat transfer. For example, the voids 30 can be filled with a fluid (e.g., a working fluid), allow the fluid to heat up, then flush the fluid out with another fluid, similar to a water flood or polymer flood. Furthermore, the inlet wellbore 814 can be filled with a high density fluid, increasing the bottomhole pressure and cause the fluid in the voids 30 to rise up the outlet wellbore 816. The fluid can be continuously circulated (e.g., in a clockwise pattern). The voids 30 increase the subsurface volume, which can increases residence time and exposure to hot earth (e.g., hot rock), which can increase heat extraction. Because residence time is the quotient of volume and volumetric flowrate, and volumetric flowrate is the quotient of mass flowrate and density, density and residence time are linked through mass flowrate.

The individual voids 30 can be interconnected either through naturally occurring or induced cracks, fissures, or conduits 34. Heat can be transferred between voids by the working fluid "F" (or another geothermal fluid in the void 30) flowing from one void to another. The voids 30 can serve as thermal repositories or reservoirs of heated fluid in periods of quiescence (e.g., without the fluid being circulated in the well) of the working fluid "F." If the subterranean zone "Z" has a relatively low thermal gradient (e.g., less than 50° C./km), a high density working fluid "F" may be introduced into void 30 to displace the formation fluid in the void 30, or to displace previously introduced lower working fluid. If the heavier fluid is left quiescent in the void 30, significant recovery of thermal energy can be realized. Additionally, the quiescent voids 30 can have electro-conductive additives or a magnetic material that can be used to guide drilling assemblies to drill additional conduits connected to the voids. For example, magnetic particles in the voids 30 can be found by ranging tools.

Figure 9:
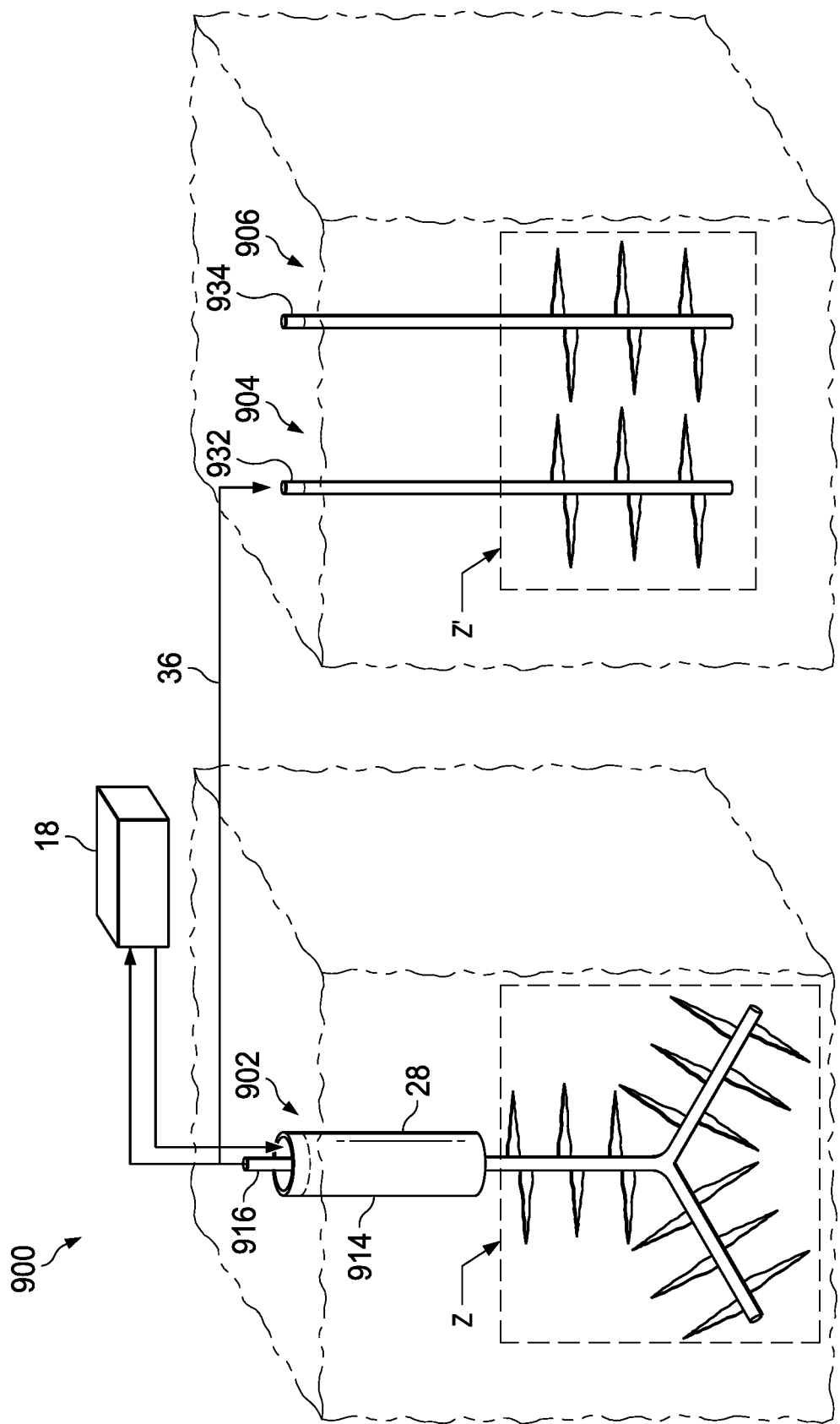
FIG. 9 is a perspective schematic view of a geothermal system according to a ninth implementation of the present disclosure.

FIG. 9 shows a geothermal system 900 that includes a surface facility 18, a first geothermal well 900 residing in a first subterranean zone "Z," and two geothermal wells 904 and 906 residing in a second geothermal zone "Z'" spaced from the first geothermal zone "Z." The first well 902 includes a surface conduit 28 similar to the surface conduit in FIG. 8. The surface conduit 916 has a fluid outlet 916 fluidly coupled to a fluid inlet 932 of at least one of the wells 904 and 906 residing in the second zone. Such an arrangement may be utilized when one of the two wells 904 and 906 act as a repository for storing a large amount of thermally charged fluid. The first wellbore 902 can flow part of the heated fluid to initiate a geothermal cycle in the two wellbores 904 and 906, which can help avoid auxiliary energy input to the two wellbores 904 and 906.

Figure 10:
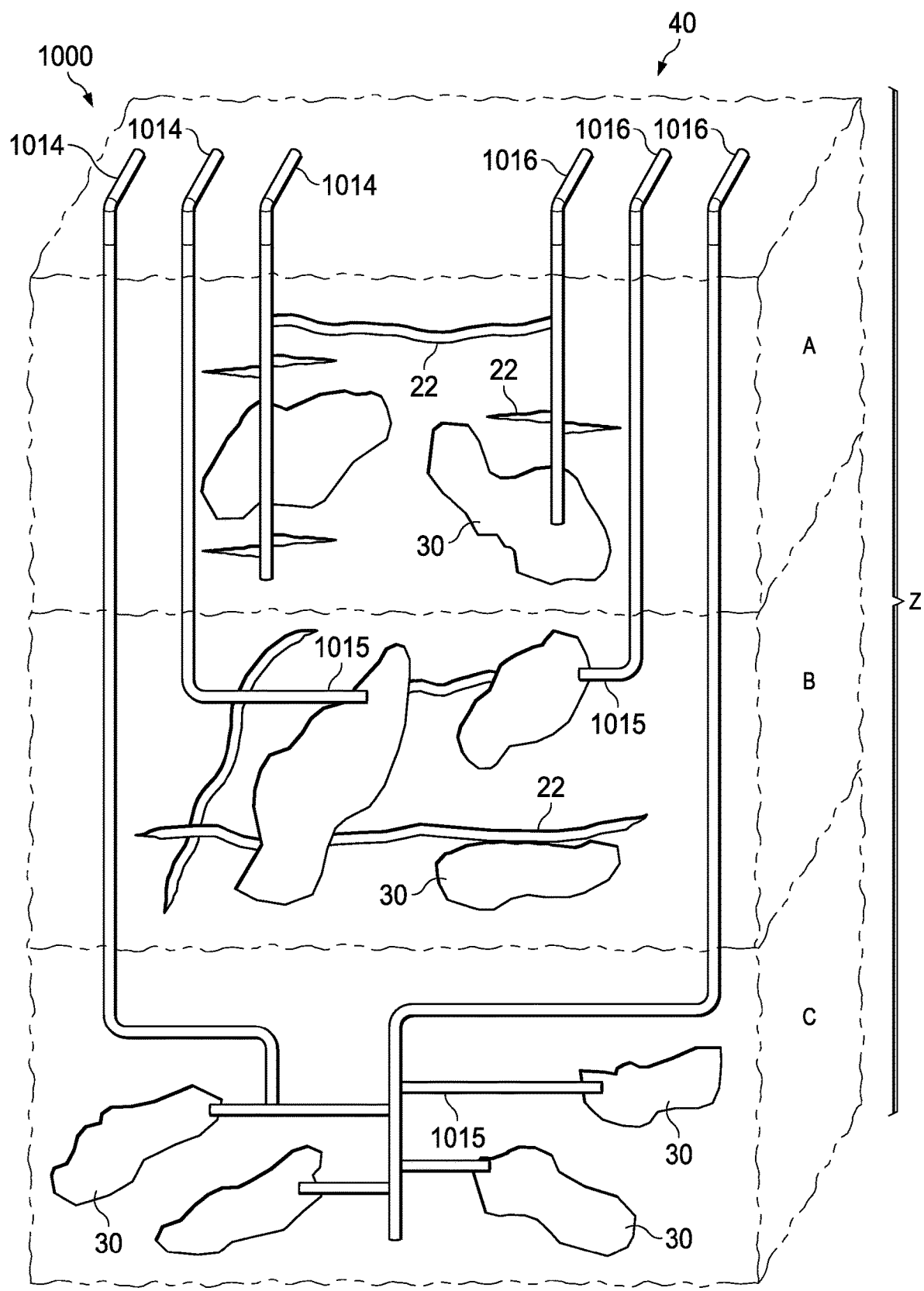
FIG. 10 is a perspective schematic view of a geothermal system according to a tenth implementation of the present disclosure.

FIG. 10 shows a geothermal system 1000 that includes multiple surface inlet wellbores 1014, multiple surface outlet wellbores 1016, and multiple respective deviated wellbores 1015. The system 1000 also includes voids 30, cracks 22, fluid conduits 22, and multiple target geothermal subterranean zones "A," "B," and "C." Each subterranean zone can have different temperatures. A first pair of inlet and outlet wellbores 1014 and 106 is associated with the first zone "A," a second pair of inlet and outlet wellbores 1014 and 106 is associated with the second zone "B," and a third pair of inlet and outlet wellbores 1014 and 106 is associated with the third zone "C." As further described in detail below with respect to FIG. 11, the inlet wellbores 1014 and the outlet wellbores 1016 can be arranged in different configurations to produce geothermal energy.

Geothermal zone "A" includes voids 30 and fluid conduits 22, one of which can interconnect the inlet 1014 to the outlet 1016. Zone "B" resides between zones "A" and "C," and can similarly include voids 30 fluidly coupled to an inlet wellbore 1014 and an outlet wellbore 1016. Zone "C" includes multiple voids 30 and multiple deviated wells 1015 fluidly coupled to the voids 30. The outlet wellbore 1016 can be configured as a 'spoked arrangement' utilizing a main outlet 1016 and multiple laterals 1015 deviated from the outlet wellbore 1016 to multiple discrete voids 30.

Figure 11:
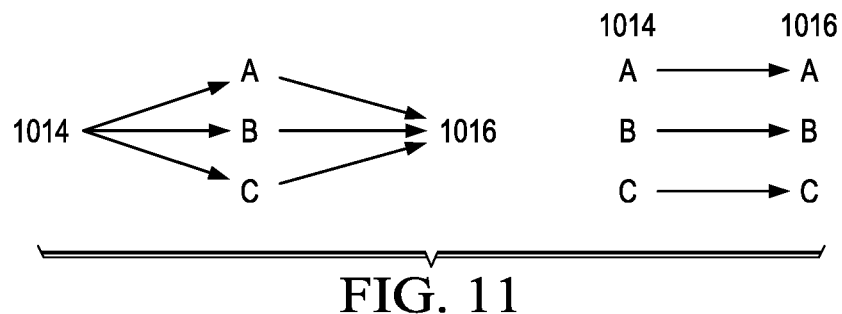
FIG. 11 is a schematic illustration of arrangements of surface inlets and surface outlets in FIG. 10.

FIG. 11 shows two possible configurations of a relationship between and inlet wellbore 1014 and an outlet wellbore 1016 shown in FIG. 10. For example, as shown in the diagram to the right, each inlet can be connected to its respective outlet (e.g., separate inlets and outlets, as shown in FIG. 10). Alternatively, as shown in the diagram to the left, all the inlets (and all the outlets) from zones "A," "B," and "C" can be commonly connected (e.g., all inlets connected to a common surface wellbore) and all outlets can be commonly connected (e.g., all outlets connected to a common surface wellbore).

Figure 12:
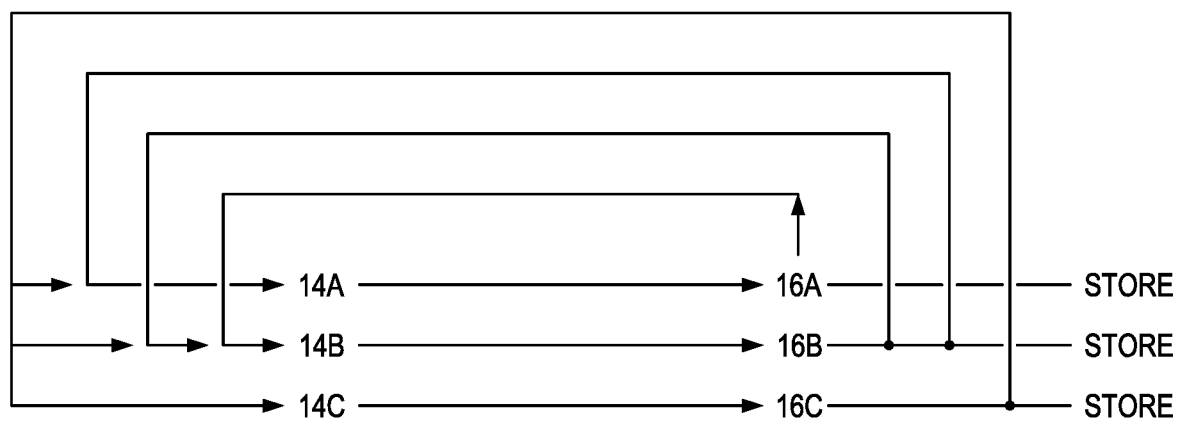
FIG. 12 is a schematic illustration of additional arrangements of the surface inlets and surface outlets in FIG. 10.

FIG. 12 shows a schematic illustration of different possible configurations of the inlet wellbores 1014 and outlet wellbores 1016 in FIG. 10. For example, at least a portion of the outlet energy recovery from the thermal recovery fluid in zone "A" may be recirculated to the inlet of zone "A" and/or zone "B" or storage in a predetermined repository anywhere in the system 40.

As a further alternative or incorporated sequence of operations, at least a portion of the outlet energy recovery from the thermal recovery fluid utilized in zone "B" may be recirculated to the inlet of zone "B" and/or zone "A" or storage in a predetermined repository anywhere in the system 40.

As a further alternative or incorporated sequence of operations, at least a portion of the outlet energy recovery from the thermal recovery fluid utilized in zone "C" may be recirculated to the inlet of zone "C" and/or zone "A," zone "B," or storage in a predetermined repository anywhere in the system 40.

By these operations, the designer and operator can have significant degrees of freedom to create a thermal recovery operation from a thermally productive formation which can require minimal energy input and in a significant amount of scenarios facilitates a self-sustaining energy production platform.

Figure 13:
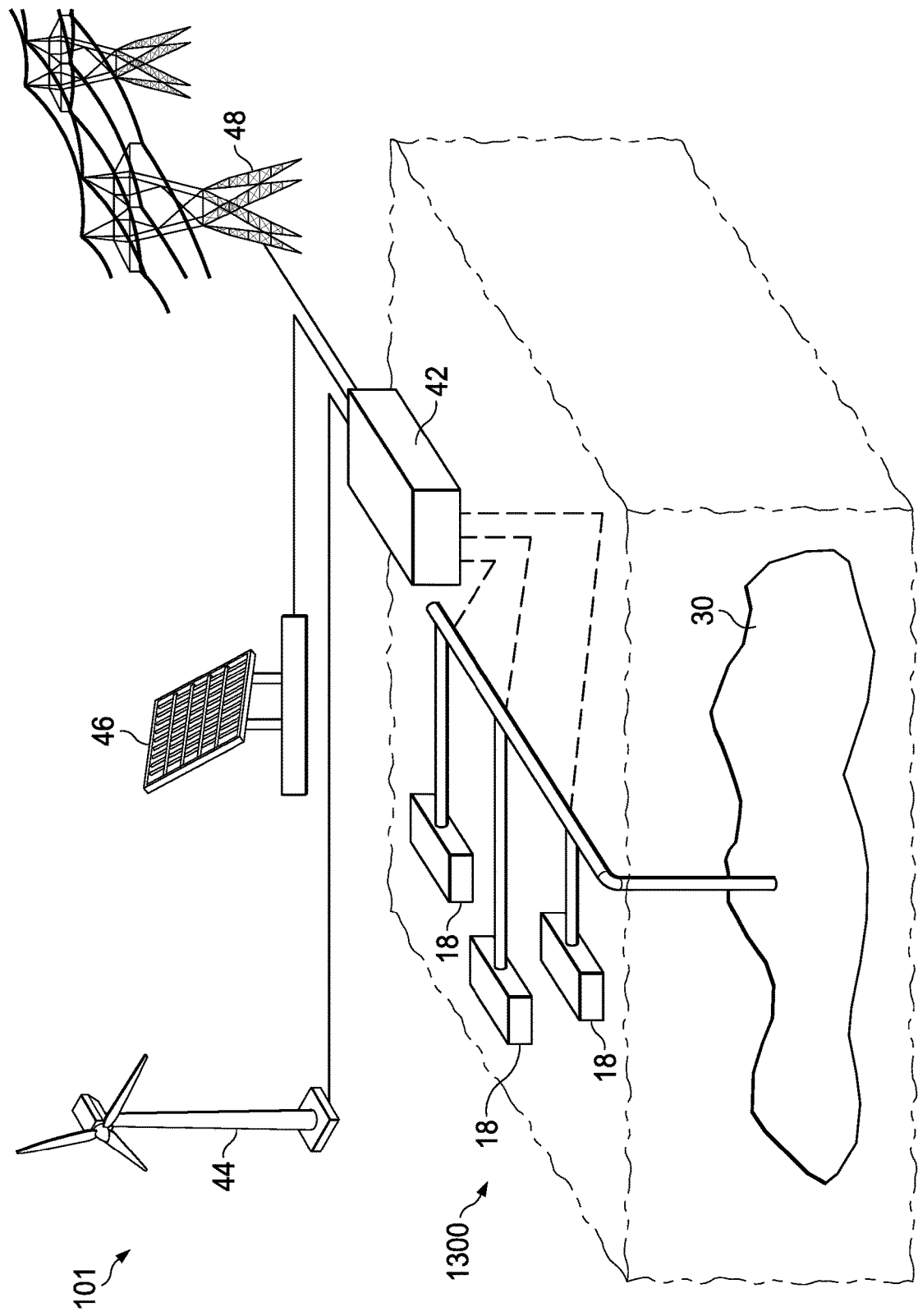
FIG. 13 is a perspective schematic view of a geothermal system according to an eleventh implementation of the present disclosure.

FIG. 13 is a schematic illustration of an integrated system 101 where a geothermal system 1300 (e.g., a system similar to any of the geothermal systems shown in FIGS. 1-10) generates electricity at the surface facilities 18, which is collected at a power distribution center 42. From the center 42, the electrical energy can be used to supplement intermittent energy sources such as wind arrangements 44, solar arrangements 46 and/or to supply a grid 48. Additionally, of the arrangements or grid can be augmented through thermal energy stored in a repository void 30 for selected temporal conversion to energy in facility 18.

Figure 14A:
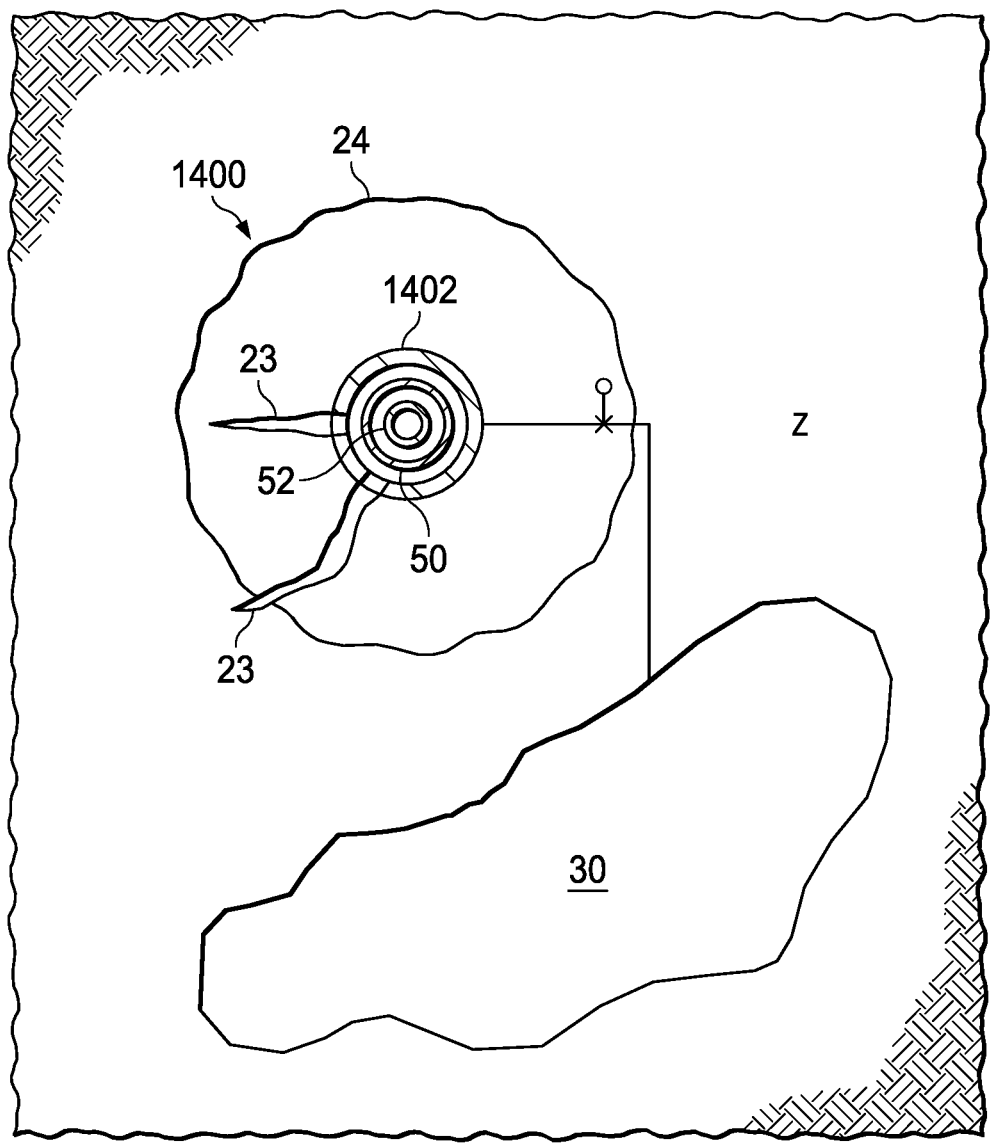
FIG. 14A is a top cross-sectional view of a geothermal system according to a twelfth implementation of the present disclosure.
Figure 14B:
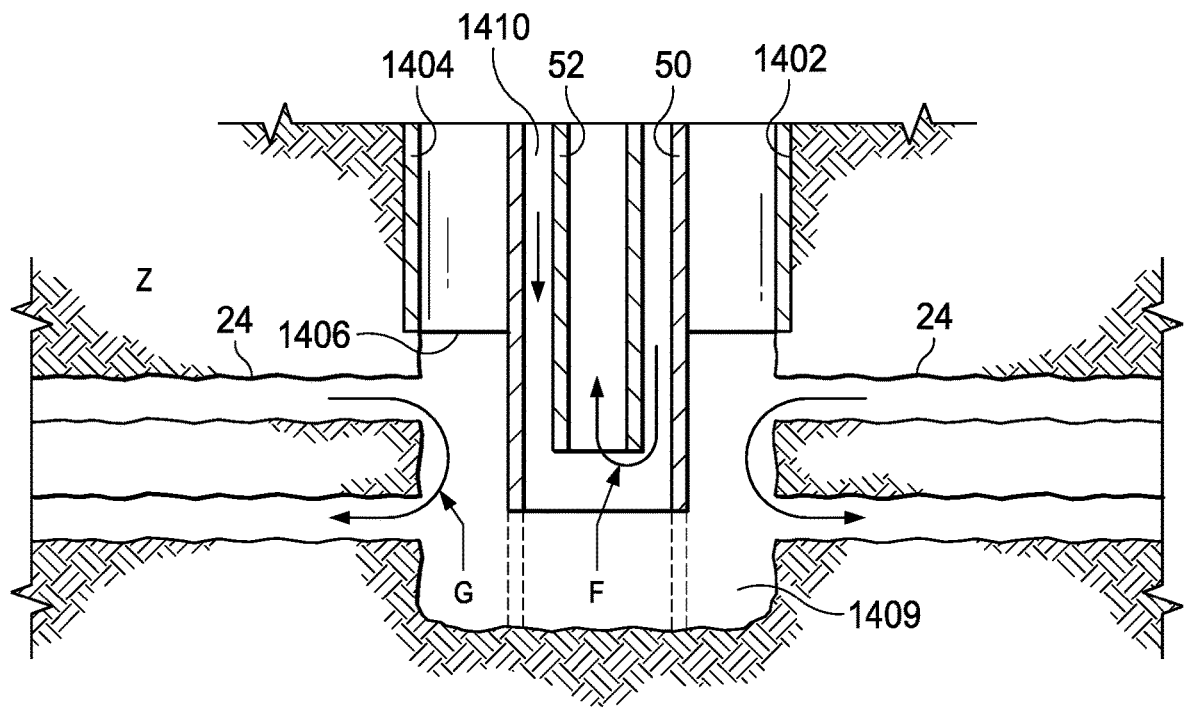
FIG. 14B is a front, cross-sectional view of a portion of the geothermal system in FIG. 14A.

FIGS. 14A and 14B show a geothermal system that includes a vertical or non-vertical geothermal well 1400 with a tube-in-tube configuration. The target subterranean zone "Z" has fluid conduits 23 (e.g., fractures, fissures, cracks, or branch wellbores) extending from the wellbore 1402. The target subterranean zone "Z" can also have voids 30 fluidly coupled to the well 1400.

As shown in FIG. 14B, when the wellbore 1402 is vertical, the fluid conduits 23 can be formed as fractures 24 (e.g., planar fractures) at a downhole end 1406 of the wellbore. The fractures 24 can be 'stacked' and they can intersect within each other (e.g., fluidly coupled at their distal end) to flow a geothermal fluid "G." For example, the vertical wellbore 1402 can have casing 1404 from the surface of the wellbore to above a downhole end 1406 of the wellbore 1402. The fractures 24 are fluidly coupled to the open hole portion of the geothermal wellbore. A first wellbore string 50 defines a first annulus 1409 with the well of the open hole. The first annulus 1409 is fluidly and thermally coupled to the fractures 24. A second wellbore string 52 disposed within the first wellbore string 52 defines a second annulus 1410 with the first wellbore string 50. The second annulus 1410 receives the heat transfer working fluid "F," which circulates from a surface inlet of the well 1402 to the downhole end 1406, and from the downhole end 1406 through the bore of the second tube 52 to a surface outlet of the well 1402. The working fluid "F" absorbs heat from the geothermal subterranean zone "Z" as the working fluid "F" circulates in the well 1402. Specifically, the second annulus 1410 can be fluidly isolated (by the first string 50 reaching the bottom of the well) from the first annulus 1409. A geothermal fluid "G" flows in the fractures 24 to transfer, through the wall of the first wellbore string 50, heat to the fluid "F." For example, the geothermal fluid "G" can naturally flow, at the first annulus 1409, from a top fracture to a bottom fracture to heat the working fluid "F."

In some implementations, the first annulus 1409 can be fluidly coupled to the second annulus 1410 to allow the working fluid to flow in and out of the fractures 24, and then flow up the wellbore 1402 to the surface. Additionally, the wellbore 1402 can be arranged without the second tube 52 to generate a 'chimney flow' effect in which the hotter fluid flows up through the middle of the string 52 and the colder fluid flows down around the hotter fluid. Furthermore, the well 1402 can be fluidly coupled to a void 30 that can supplement thermal energy to the wellbore, directly or indirectly (e.g., by passive radiation).

Figure 15:
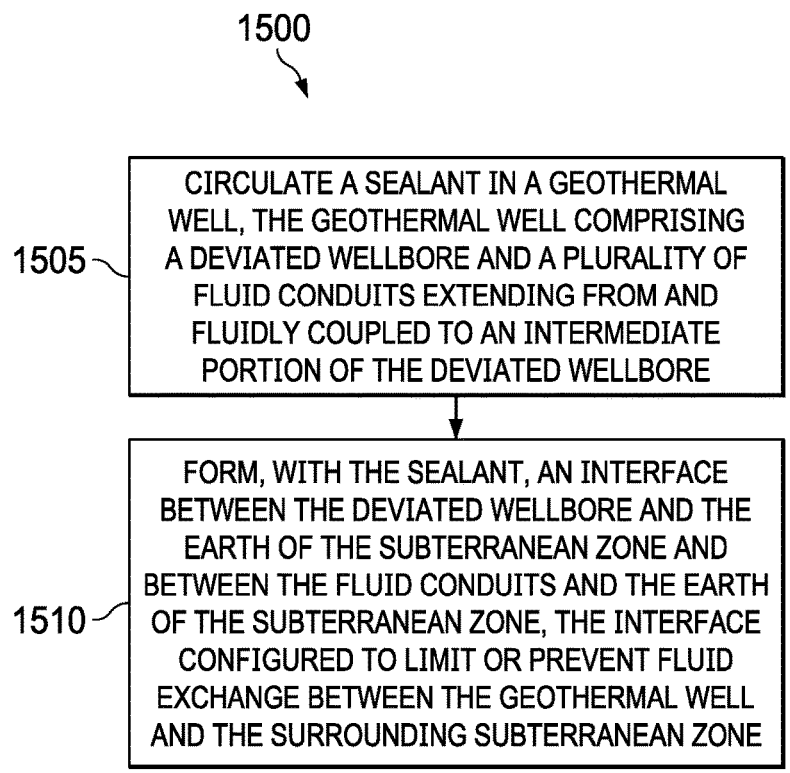
FIG. 15 is a flow chart of an example method of sealing a geothermal well.

FIG. 15 shows a flow chart of an example method 1500 of sealing a geothermal well. The method includes circulating a sealant in a geothermal well. The geothermal well includes: (i) a deviated wellbore fluidly coupled to a surface wellbore, the deviated wellbore residing in a target subterranean zone and at least a portion of the deviated wellbore in the subterranean zone being open hole, and (ii) a plurality of fluid conduits extending from and fluidly coupled to an intermediate portion of the deviated wellbore (1505). The method also includes forming, with the sealant, an interface between the deviated wellbore and the earth of the subterranean zone and between the fluid conduits and the earth of the subterranean zone. The interface limits or prevent fluid exchange between the geothermal well and the surrounding subterranean zone (1510).

Figure 16:
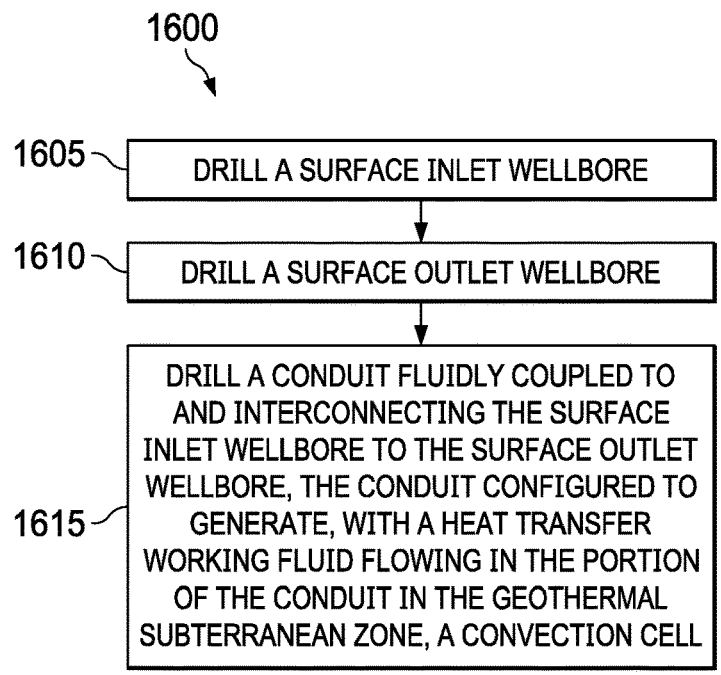
FIG. 16 is a flow chart of an example method of drilling a geothermal well.

FIG. 16 shows a flow chart of an example method 1600 of drilling a geothermal well. The method includes drilling a surface inlet wellbore (1605), drilling a surface outlet wellbore (1610), and drilling a conduit. The conduit is fluidly coupled to and interconnects the surface inlet wellbore to the surface outlet wellbore. The conduit resides in a geothermal subterranean zone and at least a portion of the conduit in the geothermal subterranean zone is open hole. The conduit generates, with a heat transfer working fluid flowing in the portion of the conduit in the geothermal subterranean zone, a convection cell (1510).

Figure 17:
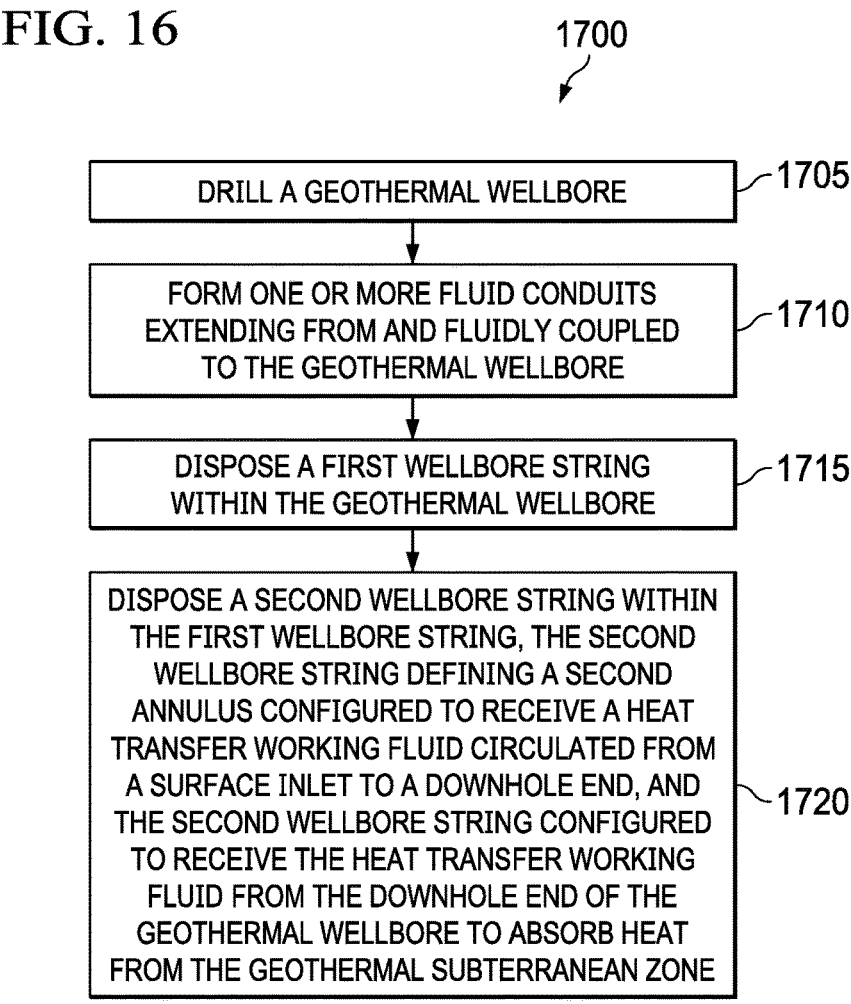
FIG. 17 is a flow chart of an example method of constructing a tube-in-tube geothermal well.

FIG. 17 shows a flow chart of an example method 1700 of constructing a tube-in-tube geothermal well. The method includes drilling a geothermal wellbore, the geothermal wellbore residing in a geothermal subterranean zone and at least a portion of the geothermal wellbore is open hole (1705). The method also includes forming one or more fluid conduits in the subterranean zone, the one or more conduits extending from and fluidly coupled to the portion of the geothermal wellbore (1710). The method also includes disposing a first wellbore string within the geothermal wellbore. The first wellbore string defines a first annulus with the portion of the geothermal wellbore. The first annulus is fluidly and thermally coupled to the one or more conduits (1715). The method also includes disposing a second wellbore string within the first wellbore string. The second wellbore string defines a second annulus with the first wellbore string. The second annulus receives a heat transfer working fluid circulated from a surface inlet of the geothermal wellbore to a downhole end of the geothermal wellbore. The second wellbore string is configured to receive the heat transfer working fluid circulated from the downhole end of the geothermal wellbore to a surface outlet of the geothermal wellbore. The heat transfer working fluid is configured to absorb heat from the geothermal subterranean zone as the heat transfer working fluid circulates in the geothermal wellbore (1720).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method comprising:
    circulating a sealant in a geothermal well, the geothermal well comprising: (i) a deviated wellbore fluidly coupled to a surface wellbore, the deviated wellbore residing in a target subterranean zone and at least a portion of the deviated wellbore in the subterranean zone being open hole, and (ii) a plurality of fluid conduits formed after or during drilling the deviated wellbore and residing in the subterranean zone, the fluid conduits extending from and fluidly coupled to an intermediate portion of the deviated wellbore; and
    forming, with the sealant, an interface between the deviated wellbore and the earth of the subterranean zone and between the fluid conduits and the earth of the subterranean zone, the interface configured to seal against fluid exchange between the geothermal well and the earth of the surrounding subterranean zone.

2. The method of claim 1, further comprising:
    circulating a heat transfer working fluid in the geothermal well from a surface inlet of the surface wellbore to a surface outlet of the geothermal well such that the heat transfer working fluid absorbs heat from the subterranean zone as the heat transfer working fluid flows through the deviated wellbore and through the fluids conduits; and
    collecting energy from the heat transfer working fluid received at the surface outlet of the geothermal well.

3. The method of claim 1, wherein the surface wellbore comprises a surface inlet wellbore and the geothermal well further comprises a surface outlet wellbore fluidly coupled to the deviated wellbore with the deviated wellbore interconnecting the surface inlet wellbore to the surface outlet wellbore, and circulating the sealant comprises circulating the sealant between the surface inlet wellbore, the deviated wellbore, the plurality of fluid conduits, and the surface outlet wellbore.

4. The method of claim 2, wherein the plurality of fluid conduits comprise at least one of (i) a plurality of branch wellbores or fractures extending downward from the deviated wellbore or (ii) a plurality of planar fractures extending radially away from the deviated wellbore.

5. The method of claim 1, wherein the plurality of fluid conduits comprise a plurality of branch wellbores or fractures extending downward from the deviated wellbore, the deviated wellbore resides in a first portion of the subterranean zone comprising a first temperature and the branch wellbores or fractures extend to a second portion of the subterranean zone comprising a second temperature greater than the first temperature, and circulating the heat transfer working fluid comprises flowing a portion of the heat transfer working fluid into the branch wellbores or fractures, generating a buoyancy convection cell in the branch wellbores or fractures such that the portion of the working fluid sinks into the branch wellbores or fractures, picks up heat, and rises due to buoyancy back into the deviated wellbore.

6. The method of claim 1, wherein forming the interface comprises forming an interface substantially impermeable to fluids in the deviated wellbore, in the plurality of fluid conduits while the plurality of fluid conduits are open hole, and in a junction connecting the deviated wellbore to the surface wellbore while the junction is open hole.

7. The method of claim 1, wherein the plurality of fluid conduits comprise a plurality of planar fractures extending radially away from the deviated wellbore, the method further comprising:
    circulating a thermally conductive fluid in the geothermal well;
    filling at least a portion of the planar fractures with the thermally conductive fluid; and
    forming, with the thermally conductive fluid, a thermally conductive interface between the deviated wellbore and the earth of the subterranean zone, the thermally conductive interface comprising a conductivity greater than the earth of the subterranean zone.

8. The method of claim 1, wherein the geothermal well further comprises: a plurality of deviated wellbores fluidly coupled to and extending from a common downhole end of the surface wellbore, each of the plurality of deviated wellbores residing in the target subterranean zone and at least a portion of each of the plurality of deviated wellbore in the subterranean zone being open hole.

9. The method of claim 1, wherein the geothermal well further comprises a surface outlet wellbore, the surface wellbore is a surface inlet wellbore, and the deviated wellbore is an interconnecting wellbore fluidly coupled to and interconnecting the surface inlet wellbore to the surface outlet wellbore, the interconnecting wellbore comprising (i) a first lateral wellbore extending from a downhole end of the surface inlet wellbore to a downhole junction, and (ii) a second lateral wellbore extending from a downhole end of the surface outlet wellbore to the downhole junction.

10. The method of claim 9, wherein the first lateral wellbore resides in a first portion of the target subterranean zone comprising a first temperature, and the second lateral wellbore resides below the first lateral wellbore, the second lateral wellbore resides in a second portion of the target subterranean zone comprising a second temperature greater than the first temperature, and circulating the heat transfer working fluid comprises generating, with the heat transfer working fluid flowing in the interconnecting wellbore, a thermal convection cell that transfers heat through convection from the second lateral wellbore to the first lateral wellbore.

11. The method of claim 1, wherein the fluid conduits are formed after drilling the wellbore by at least one of: (i) directionally drilling the earth of the subterranean zone, (ii) fracturing the earth of the subterranean zone, or (iii) perforating the earth of the subterranean zone such that the fluid conduits increase an available heat transfer area of the geothermal well, and forming the interface comprises forming the interface between the fluid conduits and the earth of the subterranean zone while the fluid conduits are open hole.

\* \* \* \* \*